(12) United States Patent
Abouelseoud

(10) Patent No.: US 11,349,549 B2
(45) Date of Patent: *May 31, 2022

(54) ALLOCATION AND DIRECTIONAL INFORMATION DISTRIBUTION IN MILLIMETER WAVE WLAN NETWORKS

(71) Applicant: SONY GROUP CORPORATION, Tokyo (JP)

(72) Inventor: Mohamed Abouelseoud, San Francisco, CA (US)

(73) Assignee: SONY GROUP CORPORATION, Tokyo (JP)

(*) Notice: Subject to any disclaimer, the term of this patent is extended or adjusted under 35 U.S.C. 154(b) by 15 days.

This patent is subject to a terminal disclaimer.

(21) Appl. No.: 16/918,214

(22) Filed: Jul. 1, 2020

(65) Prior Publication Data

US 2020/0412435 A1 Dec. 31, 2020

Related U.S. Application Data

(63) Continuation of application No. 16/203,164, filed on Nov. 28, 2018, now Pat. No. 10,742,299.

(Continued)

(51) Int. Cl.
*H04B 7/06* (2006.01)
*H04W 40/24* (2009.01)
(Continued)

(52) U.S. Cl.
CPC ......... *H04B 7/0695* (2013.01); *H04L 5/1469* (2013.01); *H04W 40/244* (2013.01);
(Continued)

(58) Field of Classification Search
CPC .. H04B 7/0695; H04W 40/244; H04W 48/16; H04W 72/0446
See application file for complete search history.

(56) References Cited

U.S. PATENT DOCUMENTS 7,333,458 B2  2/2008  Cain
8,503,377 B2  8/2013  Cordeiro
(Continued)

FOREIGN PATENT DOCUMENTS

CN  102215061 A  10/2011
CN  102318392 A  1/2012
(Continued)

OTHER PUBLICATIONS

ISA/EP, European Patent Office (EPO), International Search Report and Written opinion dated Dec. 3, 2019, releated PCT international application No. PCT/IB2019/056730, pp. 1-13, claims searched, pp. 14-19.

(Continued)

*Primary Examiner* — Mohammad S Anwar
(74) *Attorney, Agent, or Firm* — O'Banion & Ritchey LLP; John P. O'Banion

(57) ABSTRACT

A wireless communication apparatus, system or method utilizing directional data transmission over a communication (e.g., mmW) band, and broadcasting time and directional allocations in each direction. Stations sending beacons containing time and directional allocations in its direction of transmission. Stations comparing beam identifications with received allocation to determine if the allocation is in the direction of reception. Stations performing receiver beamforming with a station from which a beacon was received in order to determine if the station can access the direction (channel) in its intended direction.

20 Claims, 20 Drawing Sheets

Related U.S. Application Data

(60) Provisional application No. 62/719,782, filed on Aug. 20, 2018.

(51) Int. Cl.

| | | |
|---|---|---|
| *H04W 48/16* | (2009.01) | |
| *H04W 72/04* | (2009.01) | |
| *H04L 5/14* | (2006.01) | |
| *H04W 72/12* | (2009.01) | |
| *H04W 84/12* | (2009.01) | |

(52) U.S. Cl.
CPC ......... *H04W 48/16* (2013.01); *H04W 72/046* (2013.01); *H04W 72/0446* (2013.01); *H04W 72/1263* (2013.01); *H04W 84/12* (2013.01)

(56) References Cited

U.S. PATENT DOCUMENTS

| | | | |
|---|---|---|---|
| 8,755,302 | B2 | 6/2014 | Shao |
| 9,258,046 | B2 | 2/2016 | Sinha |
| 9,295,033 | B2 | 3/2016 | Quan |
| 2006/0215624 | A1 | 9/2006 | Atul |
| 2007/0011435 | A1 | 1/2007 | Lee |
| 2008/0175197 | A1 | 7/2008 | Shao |
| 2010/0110981 | A1 | 5/2010 | Shao |
| 2010/0214169 | A1 | 8/2010 | Kafle |
| 2011/0069636 | A1 | 3/2011 | Shao |
| 2011/0199918 | A1 | 8/2011 | Sampath |
| 2011/0205969 | A1 | 8/2011 | Ahmad |
| 2011/0299422 | A1 | 12/2011 | Kim |
| 2012/0026941 | A1 | 2/2012 | Ahmad |
| 2012/0057580 | A1 | 3/2012 | Hansen |
| 2015/0131481 | A1 | 5/2015 | Lagrange |
| 2015/0189545 | A1 | 7/2015 | Morita |
| 2015/0201368 | A1 | 7/2015 | Cudak |
| 2015/0237548 | A1 | 8/2015 | Luo |
| 2015/0289147 | A1 | 10/2015 | Lou |
| 2015/0319700 | A1 | 11/2015 | Oteri |
| 2015/0351135 | A1 | 12/2015 | Schmidt |
| 2015/0365155 | A1 | 12/2015 | Subramanian |
| 2015/0373572 | A1 | 12/2015 | Sahin |
| 2015/0373618 | A1 | 12/2015 | Deenoo |
| 2015/0382171 | A1 | 12/2015 | Roy |
| 2016/0044711 | A1 | 2/2016 | Lou |
| 2016/0191132 | A1 | 6/2016 | Rajagopal |
| 2016/0192395 | A1* | 6/2016 | Yoo ................ H04W 16/14 370/329 |
| 2016/0255660 | A1* | 9/2016 | Son ................ H04W 76/40 370/329 |
| 2016/0269137 | A1* | 9/2016 | Lindoff ............ H04L 5/14 |
| 2016/0380685 | A1 | 12/2016 | Kasher |
| 2017/0064583 | A1 | 3/2017 | Roy |
| 2017/0086211 | A1 | 3/2017 | Sahin |
| 2017/0180025 | A1* | 6/2017 | Cariou ............ H04W 52/04 |
| 2017/0223587 | A1 | 8/2017 | Trainin |
| 2017/0223744 | A1* | 8/2017 | Qian ............... H04W 16/28 |
| 2017/0346525 | A1 | 11/2017 | Stirling-Gallacher |
| 2018/0098366 | A1 | 4/2018 | Cohn |
| 2018/0115994 | A1 | 4/2018 | Islam |
| 2018/0123660 | A1 | 5/2018 | Jung |
| 2018/0199324 | A1* | 7/2018 | Sun ................ H04W 16/28 |
| 2018/0206139 | A1 | 7/2018 | Wang |
| 2018/0331914 | A1 | 11/2018 | Yoshida |
| 2018/0343605 | A1 | 11/2018 | Wu |
| 2019/0007822 | A1 | 1/2019 | Wee |
| 2019/0045520 | A1* | 2/2019 | Venkatachalam Jayaraman ........ H04W 72/121 |
| 2019/0075607 | A1 | 3/2019 | Park |
| 2019/0104546 | A1 | 4/2019 | Chendamarai Kannan |
| 2019/0208540 | A1 | 7/2019 | Kim |

FOREIGN PATENT DOCUMENTS

| | | |
|---|---|---|
| CN | 103348757 A | 10/2013 |
| CN | 104982049 A | 10/2015 |
| CN | 105052235 A | 11/2015 |
| CN | 105722051 A | 6/2016 |
| CN | 105981310 A | 9/2016 |
| CN | 107949057 A | 4/2018 |
| EP | 2104245 A1 | 9/2009 |
| EP | 3046378 | 7/2016 |
| JP | 2012503944 A | 2/2012 |
| JP | 2012199680 A | 10/2012 |
| JP | 2013520937 A | 6/2013 |
| JP | 2014520445 A | 8/2014 |
| JP | 2016511585 A | 4/2016 |
| JP | 2017188836 A | 10/2017 |
| KR | 20080088572 A | 10/2008 |
| KR | 20120100895 A | 9/2012 |
| KR | 20150117288 A | 10/2015 |
| WO | 2014124048 | 8/2014 |
| WO | 2015138914 | 9/2015 |
| WO | 2015138914 A1 | 9/2015 |
| WO | 2016065068 | 4/2016 |
| WO | 2016065068 A2 | 4/2016 |
| WO | 2016086144 | 6/2016 |
| WO | 2016126338 A1 | 8/2016 |
| WO | 2016210302 | 12/2016 |
| WO | 2017063496 | 4/2017 |
| WO | 2017095613 | 6/2017 |

OTHER PUBLICATIONS

China Patent Office, Official Action dated Oct. 11, 2021, related Chinese patent application No. 201880081476.9, pp. 1-10, English-language translation, pp. 11-20, claims, pp. 21-26.

Park, Hyunhee et al., "Multi-band Directional Neighbor Discovery in Self-Organized mmWave ad-hoc Networks", IEEE Transactions on Vehicular Technology, vol. 64, Issue 3, Mar. 2015, published Jun. 5, 2014, pp. 1143-1155.

Deng, Junquan et al., Resource Allocation and Interference Management for Opportunistic Relaying in Integrated mmWave/sub-6GHz 5G Networks, IEEE Communications Magazine, vol. 55, Issue 6, Jun. 12, 2017, pp. 94-101.

ISA/EP, European Patent Office (EPO), International Search Report and Written Opinion dated Apr. 5, 2019, related PCT international application No. PCT/IB2018/060465, pp. 1-17, claims searched, pp. 18-23.

ISA/EPO, International Search Report and Written Opinion dated Dec. 17, 2018, related PCT international application No. PCT/IB2018/057374, pp. 1-15, claims searched, pp. 16-21.

Astudillo, Gabriel et al., "Neighbor discovery and routing schemes for mobile ad-hoc networks with bandwidth adaptive smart antennas", Telecommun Syst (2017) 66:17-27, published online Jan. 10, 2017.

ISA/EP, European Patent Office (EPO), International Search Report and Written Opinion dated Nov. 23, 2018, related PCT international application No. PCT/IB2018/056562, pp. 1-20, claims searched, pp. 21-27.

Taiwan Patent Office, Official Action dated May 17, 2019, related Taiwan patent application No. 107130827, pp. 1-11, English-language translation, pp. 12-21, claims examined, pp. 22-18.

Shokri-Ghadikolaei, Hossein et al., "Millimeter Wave Ad Hoc Networks: Noise-limited or Interference-limited?", 2015 IEEE Globecom Workshops (GCW kshps), Feb. 25, 2016, pp. 1-7.

Zou Ning, "Information Technology and Standardization", Issue 03, IEEE 802.11ad Standard and Application, Mar. 10, 2013, pp. 1-13.

Wang, Liang-min et al., "Overview of Internet of vehicles for 5G", Chinese Journal of Network and Information Security, Issue 06, Jun. 2016, pp. 1-21.

China National Intellectual Property Administration (CNIPA), Notification of the First Office Action dated Jan. 29, 2022, English-language translation, related Chinese Patent Application No. 201880056135.6, pp. 1-9.

\* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| Octets: 1 | 1 | 1 | 1 | 1 | 1 | 1 | 1 | 1 |

FIG. 4
(Prior Art)

| Frame control | Duration | RA | TA | SSW | SSW Feedback | FCS |
|---|---|---|---|---|---|---|
| Octets: 2 | 2 | 6 | 6 | 3 | 3 | 4 |

**FIG. 7
(Prior Art)**

| B0 | B1 B9 | B10 B15 | B16 B17 | B18 B23 |
|---|---|---|---|---|
| Direction | CDOWN | Sector ID | DMG Antenna ID | RXSS Length |
| Bits: 1 | 9 | 6 | 2 | 6 |

**FIG. 8
(Prior Art)**

| B0 B8 | B9 B10 | B11 B15 | B16 | B17 B23 |
|---|---|---|---|---|
| Total sectors in ISS | Number of RX DMG antennas | Reserved | Poll Required | Reserved |
| Bits: 9 | 2 | 5 | 1 | 7 |

**FIG. 9A
(Prior Art)**

| B0 B5 | B6 B7 | B8 B15 | B16 | B17 B23 |
|---|---|---|---|---|
| Sector select | DMG Antenna select | SNR report | Poll Required | Reserved |
| Bits: 6 | 2 | 8 | 1 | 7 |

**FIG. 9B
(Prior Art)**

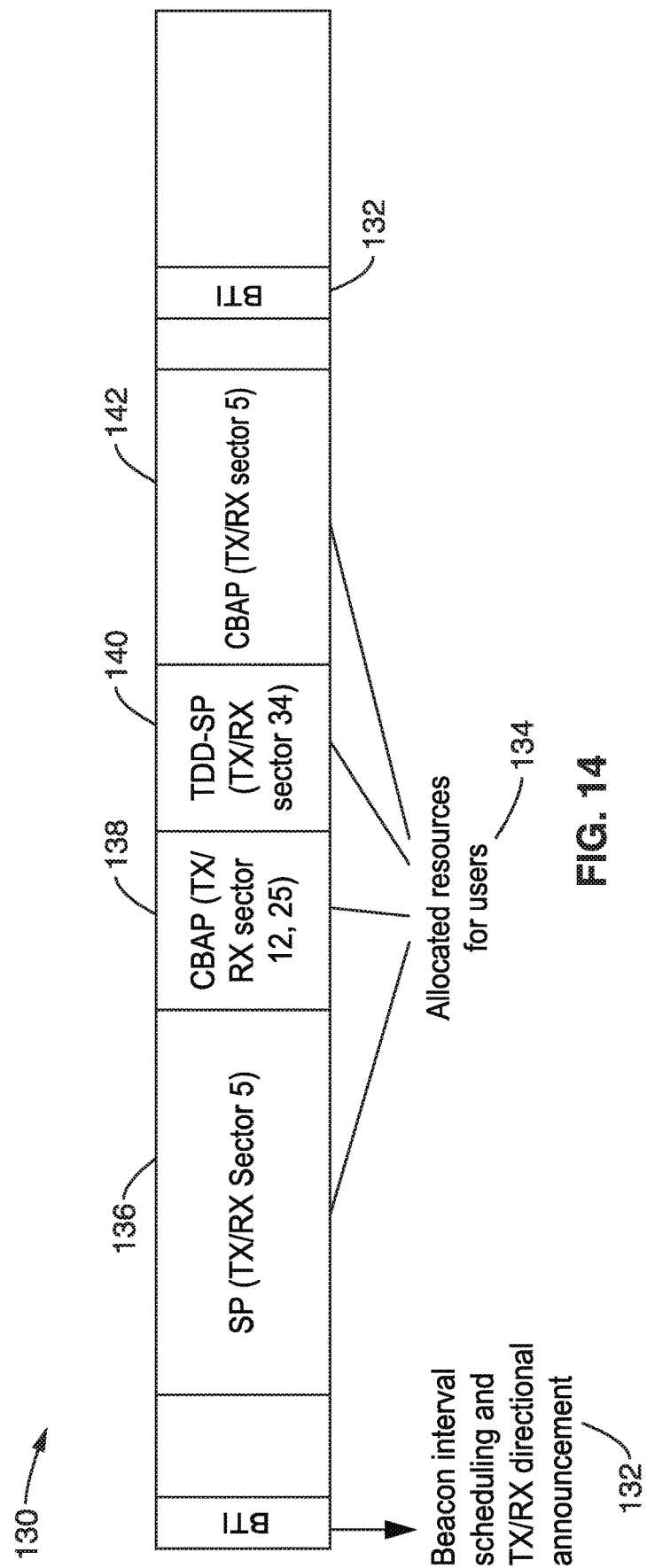

| Element ID | Length | Element ID Extension | EDGM Allocation Control | Number of Allocations | Channel Allocation 1 | ••• | Channel Allocation N |
|---|---|---|---|---|---|---|---|

| Scheduling Type | Channel Aggregation | BW | Asymmetric beamforming | Receive Direction | Transmit Direction | N STS | Nmax STS | Reserved | Allocation |
|---|---|---|---|---|---|---|---|---|---|

| B0 | B1  B6 | B7  B8 |
|---|---|---|
| ISDirectional | Sector ID | DMG Antenna ID |
| 1 | 6 | 2 |

Bits:

FIG. 19

| Element ID | Length | Element ID Extension | Slot Schedule Control | Number of TDD intervals in the Bitmap | Bitmap and Access Type Schedule | Slot Category Schedule |

| Channel Aggregation | BW | Slot Schedule Start Time | Allocation ID | Tx sector ID | TX DMG Antenna | RX Sector ID | RX DMG Antenna | Reserved |

| Element ID | Length | Element ID Extension | Number of antenna configurations | Transmit direction 1 | Receive direction 1 | ... | Transmit direction n | Receive direction n |
|---|---|---|---|---|---|---|---|---|
| | | | | Antenna Configuration 1 | | | Antenna Configuration n | |

270 ↗

| Beacon frame | TDD slot structure IE Allocation 1 | TDD Schedule IE Allocation 1 | TDD slot structure IE Allocation 2 | TDD Schedule IE Allocation 2 | ... | TDD slot structure IE Allocation n | TDD Schedule IE Allocation n |

←———————— Extra IE ————————→

Beacon frame in direction i

| Beacon frame | TDD slot structure IE Allocation 1 | TDD Schedule IE Allocation 1 | TDD slot structure IE Allocation 2 | TDD Schedule IE Allocation 2 | ... | TDD slot structure IE Allocation n | TDD Schedule IE Allocation n |

←———————— Extra IE ————————→

Beacon frame in direction i+1

ALLOCATION AND DIRECTIONAL INFORMATION DISTRIBUTION IN MILLIMETER WAVE WLAN NETWORKS

CROSS-REFERENCE TO RELATED APPLICATIONS

This application is a continuation of U.S. patent application Ser. No. 16/203,164 filed on Nov. 28, 2018, incorporated herein by reference in its entirety, which claims priority to, and the benefit of, U.S. provisional patent application Ser. No. 62/719,782 filed on Aug. 20, 2018, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional millimeter wave (mmW) wireless network communications, and more particularly to the distribution of time and directional allocation information.

2. Background Discussion

Millimeter wave (mmW) wireless local area networks (WLANs), including mesh networks and mixtures of mesh and non-mesh networks, are becoming increasingly important, especially in the millimeter wavelength (mm-Wave or mmW) regimes. In response to the need of higher capacity, network operators have begun to embrace various concepts to achieve densification. Current sub-6 GHz wireless technology is not sufficient to cope with high data demands. One alternative is to utilize additional spectrum in the 30-300 GHz band which is often referred to as the millimeter wave band (mmW).

To efficiently utilize mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

When a new station (STA or node) is starting up it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A STA connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmWave communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmWave D2D and DN technologies.

Most existing technologies for DN address discovery for networks operating in broadcast mode are not targeted to networks with directional wireless communications. In addition, those technologies which utilize directional wireless network communications often have very high overhead demands in regards to the generation of beacon signals. Still further these technologies lack sufficient mechanisms for reducing the overhead and latencies involved with performing discovery.

Current mmWave communication systems rely on directional communications to gain sufficient link budget between the transmitter (Tx) and the receiver (Rx). For a station to access the channel it first listens to check if the medium is either occupied or free. The listening phase is usually performed using a quasi-omni antenna, and in many instances this results in channel access being blocked although the transmission or reception direction is not affected by actual directional signal.

Accordingly, a need exists for enhanced mechanisms for providing more efficient channel access within a mmWave directional wireless network. The present disclosure fulfills that need and provides additional benefits over previous technologies.

BRIEF SUMMARY

To overcome the problem with blocked channel access due to interferences, a mmW WLAN protocol is described in which stations (STAs) perform more efficient time and directional allocations by broadcasting these allocations in a number of different ways, as will be described.

The approach allows a station, which finds the channel blocked when it listens to the channel, such as with a quasi-omni antenna, to continue to obtain additional information that in many cases will show that the actual transmission and/or reception direction is not affected by the signal sensed through the quasi-omni antenna. Furthermore, the instant disclosure determines if the sensed signal will affect the station trying to access the channel and the directions where the channel is occupied and free, and is configured for marking the interfering antenna directions as being busy so that nearby stations can coexist without degrading network performance.

Other solutions which could be considered in addressing these issues could involve lowering the clear channel assessment threshold in case of directional transmission. However, such approaches would likely show favoritism to nodes with higher gain as compared to others, and would still not optimize channel use. Explicit directional channel sensing could also be performed, however, this would result in substantial overheads.

The disclosed apparatus/system/method is configured for broadcasting allocation and directionality information (e.g., Transmit and Receive) in a directional WLAN network. This is performed through attaching the allocation information and the directionality information to the beacon frames that announce the WLAN network. Any STA receiving that beacon can then determine the time the channel is occupied, the time the channel is free, the spatial directions that are occupied and the spatial directions that are not occupied.

The wireless directional system disclosed is applicable to a wide range of network applications, for example device-to-device (D2D), peer-to-peer (P2P), wireless and mesh networking applications which can be applied to wireless LAN (WLAN), wireless personal area networks (WPAN), and outdoor wireless communications. The target applications for example include, but are not limited to, Wi-Fi, WiGig, and other wireless networks, Internet of things (IoT) applications, backhauling and fronthaul of data, indoor and outdoor distribution networks, mesh networks, next generation cellular networks with D2D communications, and numerous other applications as will be readily recognized by one of ordinary skill in the art.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 14 is a data field diagram depicting a WLAN frame showing allocation resources according to an embodiment of the present disclosure.

FIG. 19 is a data field diagram of a TDD slot schedule element according to an embodiment of the present disclosure.

FIG. 20 is a data field diagram of a slot schedule control field according to an embodiment of the present disclosure.

FIG. 21 is a data field diagram of a directional information element according to an embodiment of the present disclosure.

FIG. 26A and FIG. 26B are data field diagrams of different beacon frame transmissions according to an embodiment of the present disclosure.

DETAILED DESCRIPTION

Figure 1:
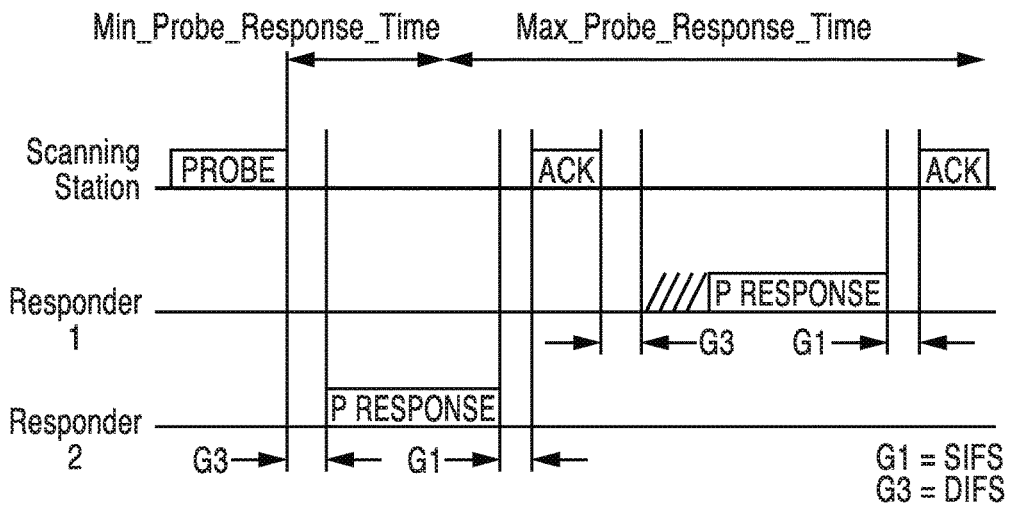
FIG. 1 is a timing diagram of active scanning performed in an IEEE 802.11 wireless local area network (WLAN).

When used in this disclosure the following terms have the meanings generally described below.

A-BFT: Association-Beamforming Training period; a period announced in the beacons that is used for association and beamform (BF) training of new stations (STAs) joining the network.

AP: Access Point; an entity that contains one station (STA) and provides access to the distribution services, through the wireless medium (WM) for associated STAs.

Beamforming (BF): a directional transmission from a directional antenna system or array, and not an omni-directional or quasi-omni antenna, for determining information for improving received signal power or signal-to-noise ratio (SNR) at the intended receiver, and under which stations can obtain information for correlating time and directional allocation information.

BSS: Basic Service Set; a set of stations (STAs) that have successfully synchronized with an AP in the network.

BI: the Beacon Interval is a cyclic super frame period that represents the time between beacon transmission times.

BRP: BF Refinement protocol is a BF protocol that enables receiver training and iteratively trains transmitter and receiver sides to optimize (achieve the best possible) directional communications.

BSS: Basic Service Set, is a component of the IEEE 802.11 WLAN architecture, built around a BSS which is actually a set of STAs connecting to the wireless medium allowing the STAs to communicate with each other.

BTI: Beacon Transmission Interval, is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

CCA: Clear Channel Assessment is a wireless carrier sense mechanism defined in IEEE 802.11.

DMG: Directional Multi-Gigabit are a form of high throughput wireless communications described in IEEE 802.

EDMG: Extended Directional Multi-Gigabit.

DTI: Data Transfer Interval is the period in which full BF training is permitted followed by actual data transfer. The DTI can include one or more service periods (SPs) and contention-based access periods (CBAPs).

LOS: Line-of-Sight, a communication in which the transmitter and receiver are ostensibly within sight of one another, and not the result of communication of a reflected signal. The opposite condition is NLOS for non-line-of-sight, wherein stations are not in LOS with one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

MCS: Modulation and Coding Scheme; defines an index that can be translated into the physical (PHY) layer (e.g., OSI model) data rate.

MSTA: Mesh station (MSTA) is a station (STA) that implements the Mesh facility, and when it operates in the Mesh BSS it may provide the distribution services for other MSTAs.

DN STA: distributed network (DN) station (DN STA) is a station (STA) that implements the DN facility. A DN STA that operates in the DN BSS may provide the distribution services for other DN STAs.

Omni-directional: a mode of transmission utilizing a non-directional antenna.

Quasi-omni directional: is a mode of communication utilizing a directional multi-gigabit (DMG) antenna with the widest beamwidth attainable.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SSID: service Set Identifier is the name assigned to a WLAN network.

STA: Station is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

TDD: Time Division Duplex allows the communication link to be duplexed, in which uplink is separated from downlink by the allocation of different time slots in the same frequency band, to adjust for different uplink and downlink data transmission flows.

TDD SP: Time Division Duplexing Service Period is a service period with TDD channel access, in which the TDD SP comprises a sequence of TDD intervals that, in turn, comprise a sequence of TDD slots.

Transmit Sector Sweep (TXSS): is transmission of multiple Sector Sweep (SSW) or Directional Multi-gigabit (DMG) Beacon frames via different sectors, in which a sweep is performed between consecutive transmissions.

1. Existing Directional Wireless Network Technology 1.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received. (b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

1.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
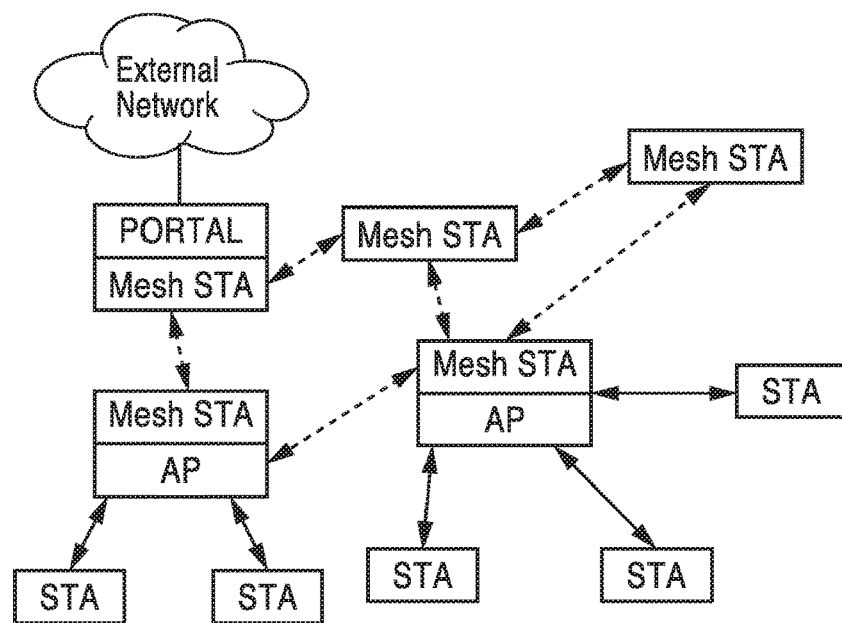
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
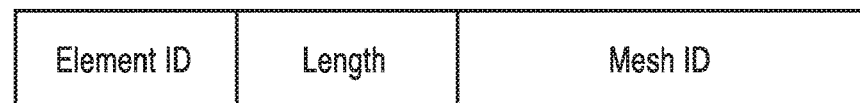
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11ad Scanning and BF Training

An example of a mmWave WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-omni directional pattern. The responder determines the antenna array sector from the initiator which provided the best link quality (e.g. SNR).

Figure 5:
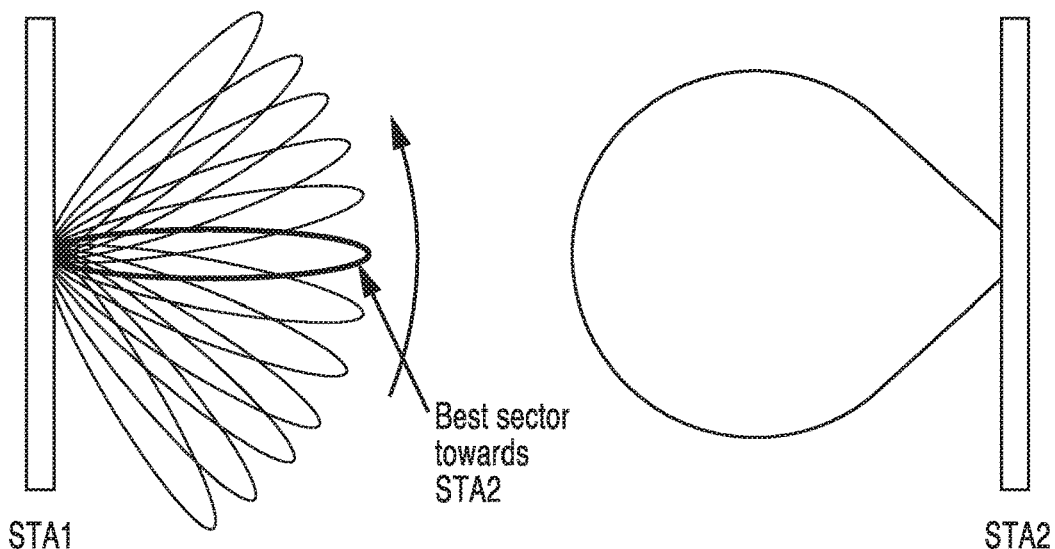
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-omni pattern. STA 2 feeds back to STA 2 the best sector it received from STA 1.

Figure 6:
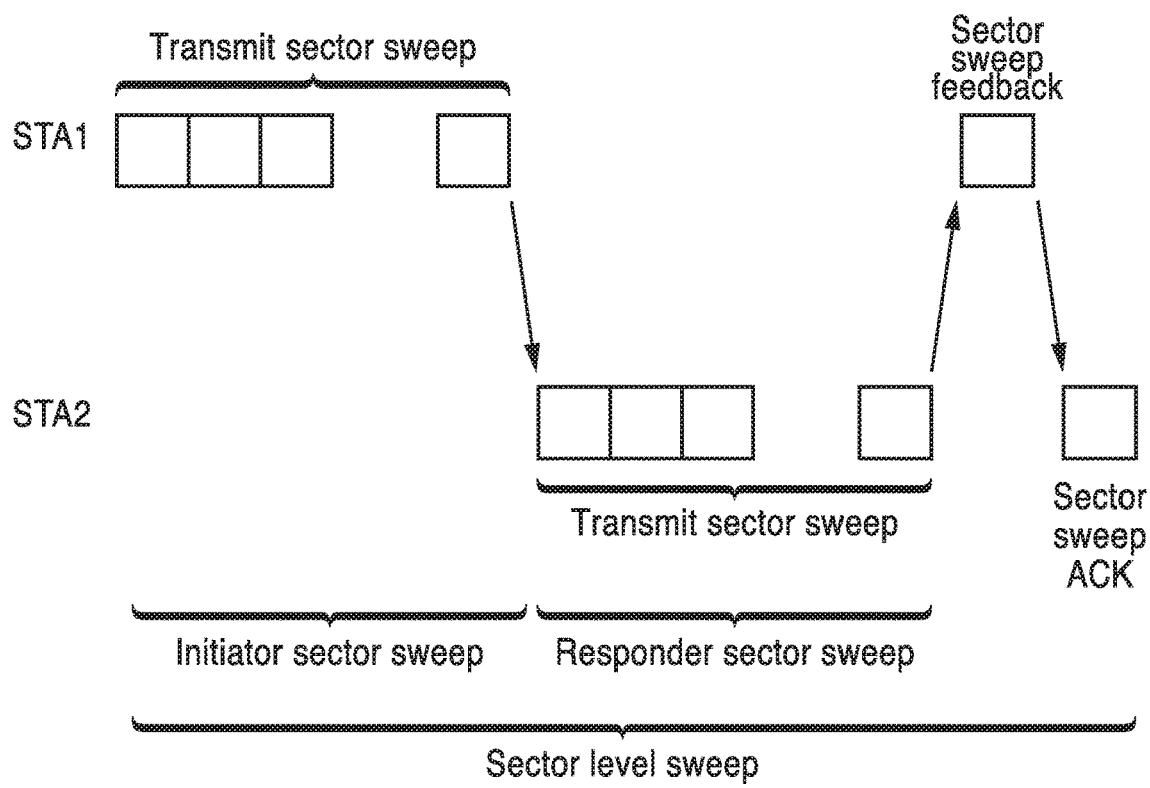
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Station (STA) Hardware Configuration

Figure 10:
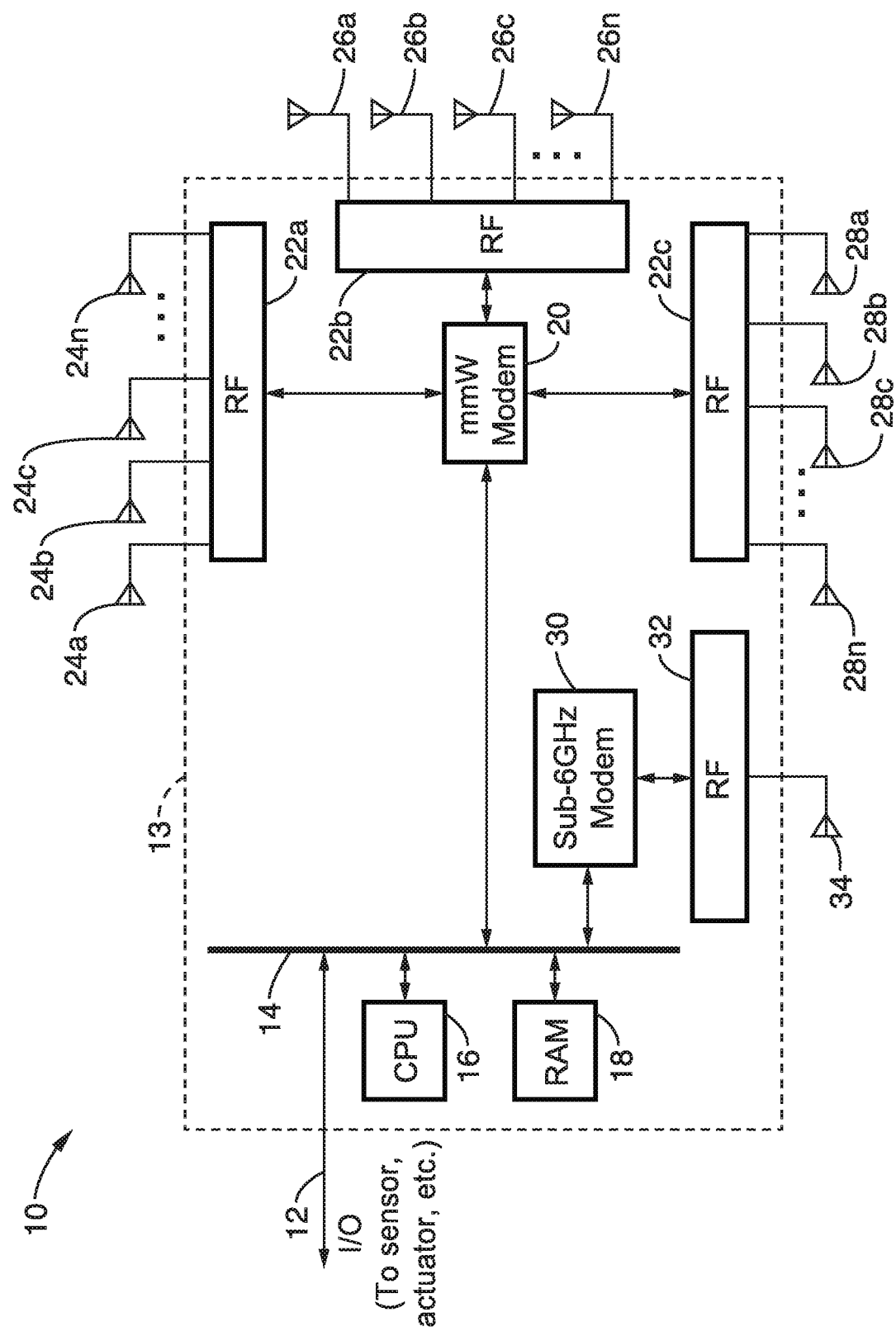
FIG. 10 is a block diagram of wireless mmW communication station hardware as utilized according to an embodiment of the present disclosure.

FIG. 10 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination), depending on what role it is playing in the current communication context. This host machine is shown configured with a mmW modem 20 coupled to radio-frequency (RF) circuitry 22a, 22b, 22c to a plurality of antennas 24a through 24n, 26a through 26n, 28a through 28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 11:
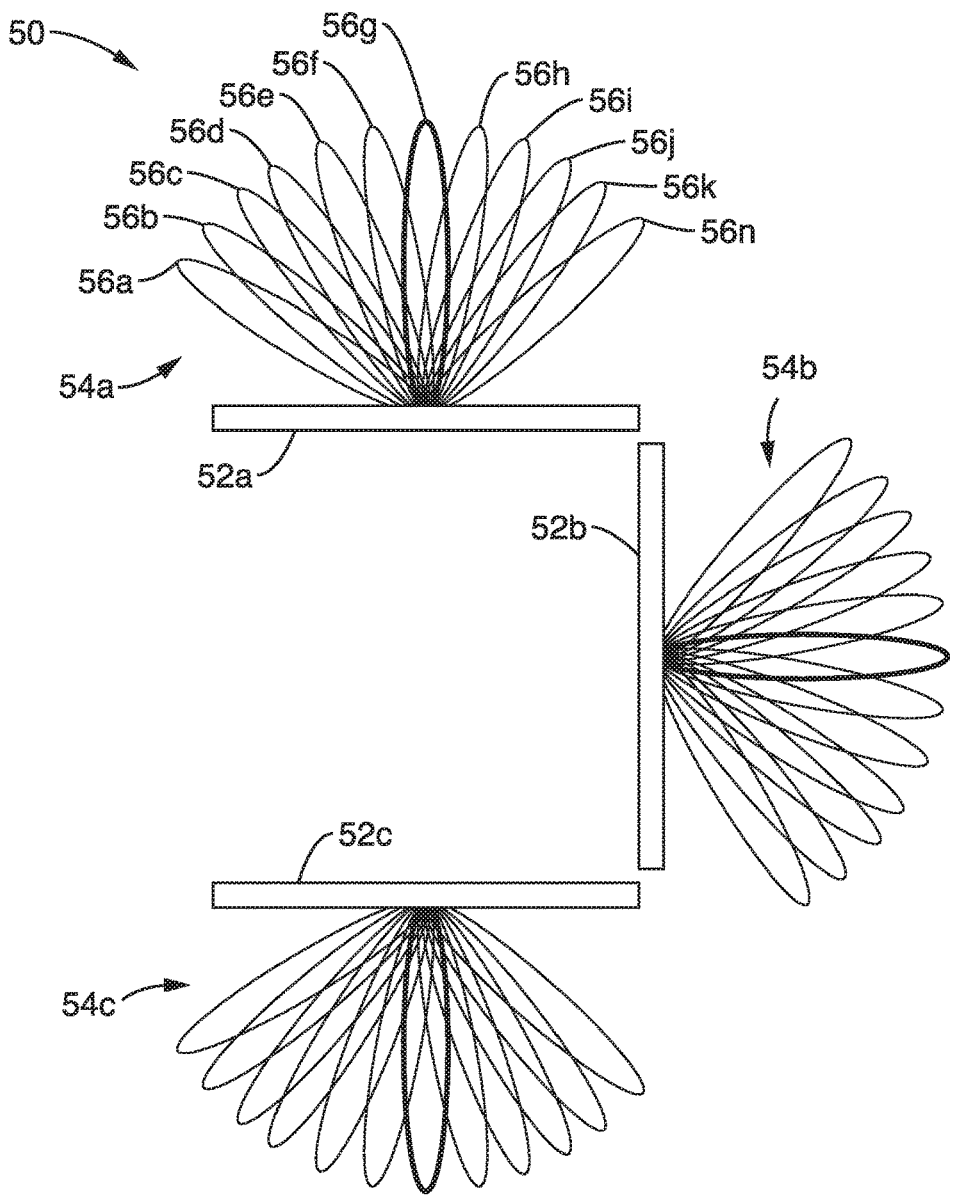
FIG. 11 is a mmW beam pattern diagram for the station hardware of FIG. 10 as utilized according to an embodiment of the present disclosure.

FIG. 11 illustrates an example embodiment 50 of mmWave antenna directions which can be utilized by a STA to generate a plurality (e.g., 36) of mmWave antenna sector patterns. In this example, the STA implements three RF circuits 52a, 52b, 52c and connected antennas, and each RF circuitry and connected antenna generate a beamforming pattern 54a, 54b, 54c. Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmWave RF circuitry and beamforming commanded by the mmWave array antenna controller. Although it is possible that STA hardware components have different functional partitions from the one described above, such configurations can be deemed to be a variant of the explained configuration. Some of the mmWave RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
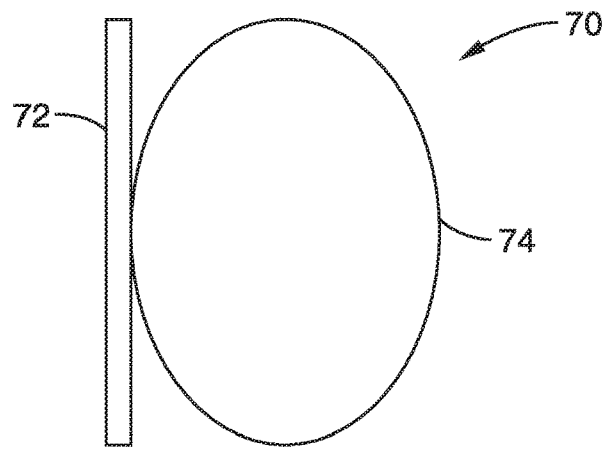
FIG. 12 is a beam pattern diagram for a discovery band communications antenna (i.e., sub-6 GHz), according to an embodiment of the present disclosure.

FIG. 12 illustrates an example embodiment 70 of antenna pattern for the sub-6 GHz modem assumed to use a quasi-omni antenna 74 attached to its RF circuitry 72, although other circuitry and/or antennas may be utilized without limitation.

3. Distributing Allocation Information in Present Disclosure

The present disclosure teaches a number of elements which provide for the distribution and use of time and directional allocation information.

Figure 13A:
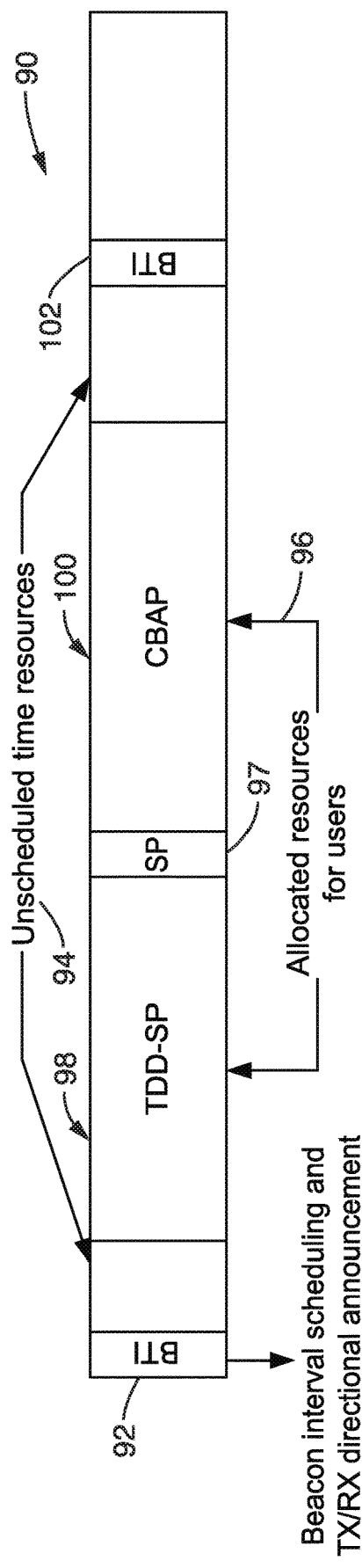
FIG. 13A and FIG. 13B are data field diagrams depicting example WLAN frames containing allocation and directional information according to an embodiment of the present disclosure.
Figure 13B:
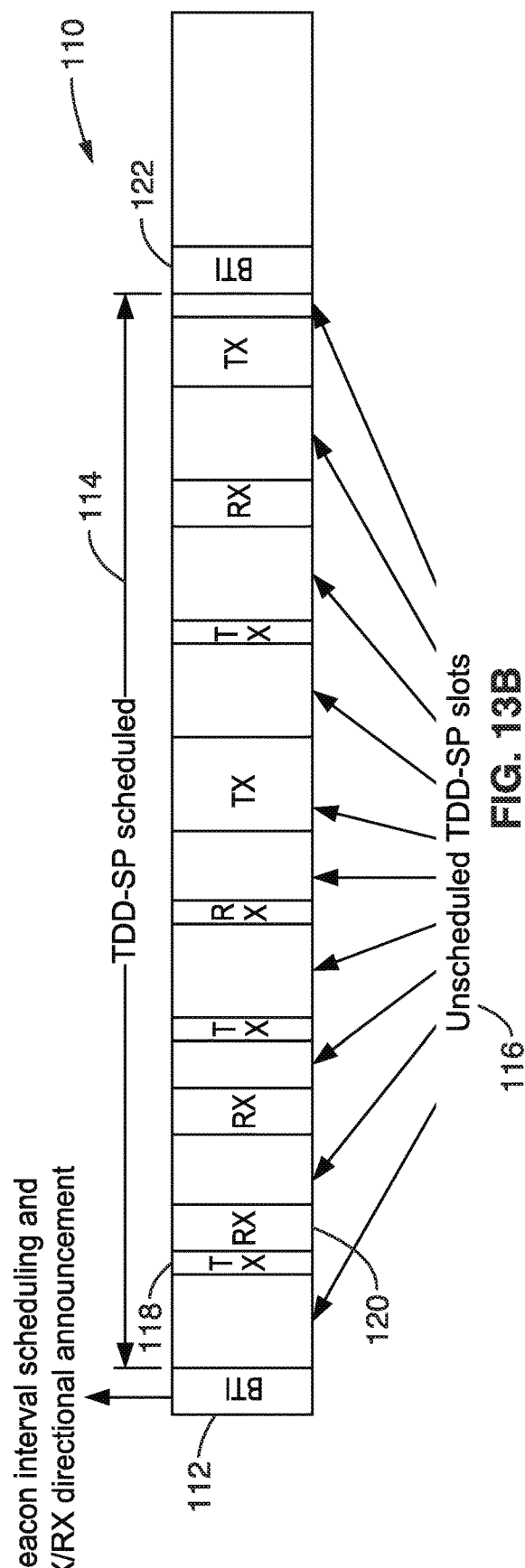

FIG. 13A and FIG. 13B illustrate example embodiments 90, 110 of a WLAN super frame. The first example in FIG. 13A illustrates an example of a super frame 90 where the BTI 92, 102 includes beacon transmission to indicate the scheduled information about the current beacon interval. The beacon transmitted during the BTI interval has information about allocated resources 96, such as the various scheduled periods (SP 97, TDD-SP 98, CBAP 100). The beacon transmitted during the BTI has information about the direction of transmission and reception as well. The beacon transmitted during the BTI also provides information 94 about the unused resources (unscheduled time resources), which represent time resources that are not assigned to the access scheme, or that are defined by the beacon as empty and unscheduled.

The second example in FIG. 13B illustrates an example in which the super frame 110 between BTI 112 and 122, is TDD-SP 114 scheduled. In this frame, the beacon transmitted in the BTI has information about the TDD-SP schedule. The node receiving the beacon can figure out (determine) the TDD slots that are not scheduled (unscheduled) 116, or that are scheduled 118, 120, to other users that will not interfere with it. By way of example a number of periods for transmit (Tx) 118 and receive (Rx) 120 are seen in the figure.

4. Directional Channel Information

The STA transmits information about the directions where data transmission and reception are taking place. This information is broadcast to nearby nodes to map the scheduled time domain information to the directions transmitted and received. The directional information in at least one embodiment includes sector ID and antenna ID of each allocated transmission or possible transmission in a specific service period.

FIG. 14 illustrates an example embodiment 130 of a WLAN frame in which the time resources are allocated 134 for users. The frame is shown with fields depicted as Beacon Transmission Intervals (BTIs) 132, Service Period (SP) (Tx/Rx) 136 (e.g., depicted for Sector 5), Contention Based Access Period (CBAP) (Tx/Rx) 138 (e.g., depicted for Sectors 12, 25), 142, and Time Division Duplex-Service Period (TDD-SP) (Tx/Rx) 140 (e.g., depicted for Sector 34). The use of each of these fields are described below in relation to the directional transmission example of FIG. 15.

Figures 15, 16, 17, 18:
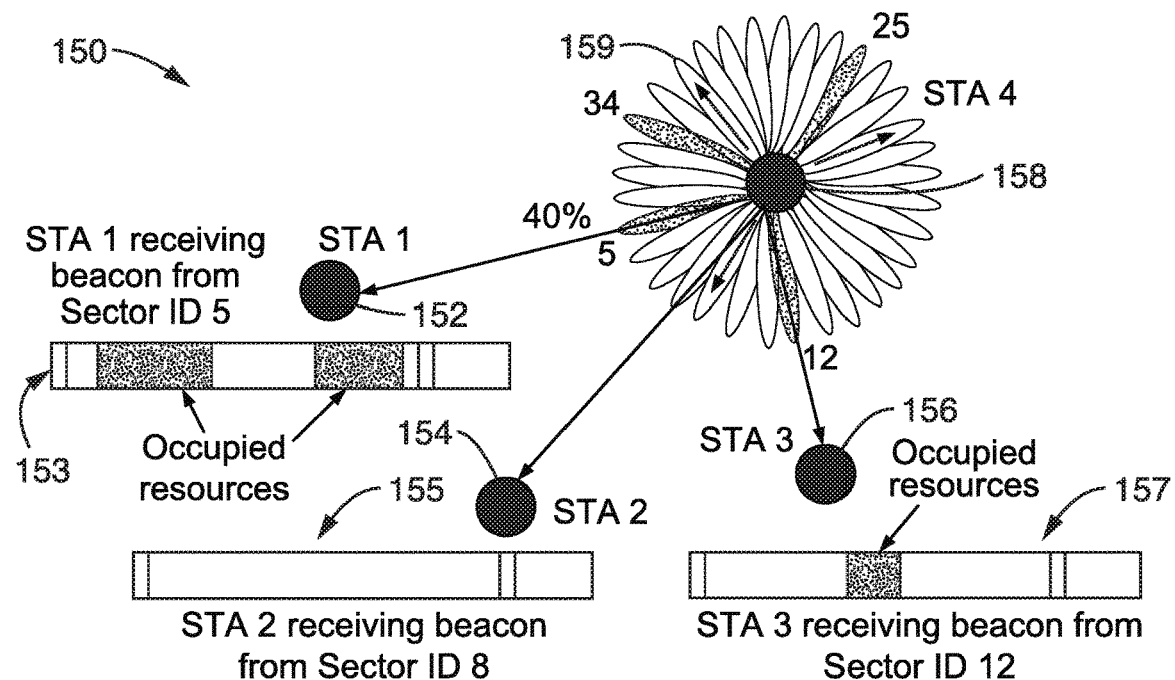
FIG. 15 is a beam pattern diagram of a station communicating through allocated resources with neighboring stations according to an embodiment of the present disclosure.
FIG. 16 is a data field diagram of Extended DMG (EDMG) scheduling according to an embodiment of the present disclosure.
FIG. 17 is a data field diagram of a channel allocation field according to an embodiment of the present disclosure.
FIG. 18 is a data field diagram of receive and transmit direction subfields according to an embodiment of the present disclosure.

FIG. 15 illustrates an example embodiment 150 in which a station (STA 4) is transmitting information in all directions. A number of STA nodes are seen as 152 STA 1, 154 STA 2, 156 STA 3, and 158 STA 4. It will be noted that STA 4 is also communicating with other STAs that are not shown for the sake of simplicity of illustration.

STA 4 is seen transmitting beacons in all directions, with sector directions 5, 12, 25 and 34 which are seen highlighted in this example figure. STA 1 152 is receiving 153 the beacon 130 of FIG. 14 from sector ID 5 from STA 4, and obtains data in a scheduled SP period 136, and CBAP period 142, of the transmission. STA 2 154 receives 155 the beacon, seen from sector 8, but there is no specific data for that sector in the beacon. STA 3 156 similarly receives 157 the beacon from sector ID 12, obtaining data in a scheduled CBAP period seen in FIG. 14 field 138.

Looking at FIG. 14, it is also seen that 158 STA 4 also communicates allocation data in sectors 25 and 34 with STAs not shown in the figure. It will be noted that STAs in the surrounding area that are receiving the beacons can determine for themselves if the allocation indicated in the beacon is coming from the same direction from which the beacon is received, or not. For example this can be performed by comparing the sector ID of the indicated allocation to the sector ID of the received beacon. If the sector ID of the received beacon matches the sector ID of the allocation, the STA considers this allocation of an occupied resource that might cause interference.

5. WLAN Coexistence

If nodes in the network are made aware of access to the channel by other nodes, then overall efficiency and coexistence can be increased between them. For TDD SP channel access, since nodes can access the channel without sensing, other nodes being aware of TDD channel usages can help increase the possibility of coexistence with a TDD SP channel. Information such as TDD slot structure, TDD scheduling for nodes in the TDD network, and direction of transmission, is preferably broadcast to all nodes in the surrounding area. Other nodes in the surrounding area scan for this information, if it exists and use it for their channel access. Other STAs using other access schemes like CBAP or regular SPs can broadcast the direction of channel usage and time allocation to help others coexist and access the channel more efficiently as well.

5.1. TDD SP Network

STAs using TDD SP are configured to transmit beacons in at least the direction of potential data transmission or reception. The direction of data transmission is the direction where a STA is beamformed with another STA and associated with it. The WLAN network beacons can carry the allocation information without any details of the TDD SP structure and assignment. In addition, WLAN network beacons can carry the allocation information without any details on the direction over which these allocations are active.

(A) Modifications for STAs in the network using TDD-SP perform as follows. (1) Each STA using TDD SP is sending beacons in at least the direction where another STA is communicating using TDD SP. (2) In at least one embodiment, the beacon contains the TDD slot structure and TDD schedule element for each allocation in the TDD SP. (3) In at least one embodiment, the TDD Schedule element contains the slot assignment and the direction of transmission (sector ID and DMG antenna ID of transmission).

(B) Modification for STAs receiving the announcement perform as follows. (1) STAs outside the TDD-SP network (e.g., using TDD-SP channel access or other channel access method) can receive the broadcast beacon if they are not engaged in transmission or reception, and if the beacon is beamformed towards its receiving direction. (2) The beacon can be readily decoded by STAs receiving the beacon. (3) STAs can obtain information about the scheduled SPs and TDD-SPs slots. (4) STAs can obtain information about scheduled slots in their directions of interest. (5) STAs can identify free slots, or time, toward obtaining interference free communication in the direction of their transmissions or receptions. (6) STAs can quickly beamform with the detected STA where a beacon is received just to determine the direction of potential interference without associating or authenticating with the discovered STA. (7) STAs can access the channel even if the Clear Channel Assessment (CCA) threshold measured using quasi-omni antenna is not met, but the detected interference is detected from a different direction other than the one intended for communication.

5.2. CBAP and Regular SP Network

STAs using CBAP and regular SP transmit beacons in all directions. STAs should at least transmit beacons in the direction of potential data transmission or reception. The direction of data transmission is the direction where a STA is beamformed with another STA and associated with it. WLAN network beacons can carry the extended schedule element, which has the allocation information, without any details of the transmit and receive antenna used by the beacon transmitting STA. If the STA is using both TDD SP and CBAP or regular SP, the extended schedule element is sent with the slot schedule and the slot structure elements. This provides information about free time between different allocation periods and inside the TDD SP period as well.

(A) Modification for STAs announcing directional and allocation information are as follows. (1) Each STA is sending beacons at least in the direction where another STA is communicating with. (2) The beacon should contain the EDMG extended schedule element where all allocations are included in the element. (3) Each allocation in the EDMG extended schedule element should specify the Tx and Rx antenna configuration used for this allocation (antenna type, sector ID and DMG antenna ID of transmission).

(B) Modification for STAs receiving the announcement is as follows. (1) STAs outside the BSS (can be using any channel access scheme) can receive the broadcast beacon if they are not engaged in transmission or reception and if the beacon is beamformed towards its receiving direction. (2) STAs receiving the beacon can decode the beacon. (3) STAs can obtain from the beacon information about the active periods where other nodes are accessing the channel. (4) STAs can obtain information about scheduled periods in its directions of interest. (5) STAs can identify free periods toward forming interference free communications in the direction of its transmission or reception. (6) STAs can quickly beamform with the detected STA where a beacon is received just to determine the direction of potential interference without associating or authenticating with the discovered STA. (7) STAs can access the channel even if the CCA threshold measured using quasi-omni antenna is not met (e.g., channel appears blocked), but the detected interference is detected from a different direction other than the one intended for communication.

5.3. Generic Direction of Transmission Announcement

STAs in some cases transmit beacons in all directions. STAs should at least transmit beacons in the direction of potential data transmission or reception. The direction of data transmission is the direction where a STA is beamformed with another STA and associated with it. Beacons according to embodiments of the present disclosure can carry a new element that contains the direction of active transmission or reception.

(A) Modification in the STAs announcing directional and allocation information is as follows. (1) Each STA is sending beacons in at least the direction that it is communicating with another STA. (2) In at least one embodiment, the beacon contains the directional information element where all active transmission and reception beam directions are included in the element. (3) In at least one embodiment, each active transmission or reception in the directional information element specifies the Tx and Rx antenna configuration used for this active communication (antenna type, sector ID and DMG antenna ID of transmission).

(B) Modification in the STAs receiving the announcement is as follows. (1) STAs outside the BSS (e.g., they can be using any channel access scheme) can receive the broadcast beacon if they are not engaged in transmission or reception and if the beacon is beamformed towards its receiving direction. (2) STAs receiving the beacon can decode the beacon. (3) STAs can obtain information about the active communication directions from the allocation information contained in the beacon. (4) STAs can quickly beamform with the detected STA where a beacon is received just to determine the direction of potential interference without associating or authenticating with the discovered STA. (5) STAs can access the channel even if the CCA threshold measured using quasi-omni antenna is not met (channel appears closed), but the detected interference is detected from a direction different from the one intended for communication.

6. Modified and New Information Elements

6.1. EDMG Extended Schedule Element and Directional Info

The EDMG Extended Schedule element defines the channel scheduling for an EDMG BSS, including indication of which channels an allocation is scheduled on.

FIG. 16 illustrates an example embodiment 170 of the EDMG extended schedule element format. The element ID, Element ID extension and length indicate the type of element and length of the element. The EDGM Allocation Control field contains some control bits to the EDMG allocation process. The Number of Allocations field indicates the number of allocations in the element. A number of channel allocation fields are shown as described below.

FIG. 17 illustrates an example embodiment 190 of the channel Allocation field. If the Scheduling type is 1 it indicates that the channel allocation field contains the complete allocation information, otherwise it only contains supplemental information. The channel aggregation and BW subfields define the BW the allocation is using. The Asymmetric Beamforming, NSTS and Nmax STS subfields are used to configure Asymmetric beamform training allocation if the Asymmetric Beamforming subfield is 1. The Receive Direction and Transmit Direction subfields indicate the receive antenna and the transmit antenna configuration that the PCP or AP uses during the allocation and are formatted as shown below. The Receive Direction and Transmit Direction subfields are reserved if the Asymmetric Beamforming Training subfield is one.

FIG. 18 illustrates an example embodiment 210 of receive and transmit direction subfields. The IsDirectional subfield is set to 1 to indicate that the PCP or AP uses a directional, non-quasi-omni antenna pattern to receive frames when it is receiving or to transmit frames when it is transmitting during the allocation, and is set to 0 otherwise. The Sector ID subfield is reserved if the IsDirectional subfield is 0. Otherwise, the Sector ID subfield indicates the sector that the AP or PCP uses to receive frames when it is receiving or to transmit frames when it is transmitting during this allocation. The DMG Antenna ID subfield is reserved if the IsDirectional subfield is 0. Otherwise, the DMG Antenna ID subfield indicates the DMG antenna that the AP or PCP uses to receive frames when it is receiving or to transmit frames when it is transmitting during this allocation.

6.2. TDD SP Allocation and Directionality Broadcasting

The TDD Schedule element contains information about the access assignment of a DMG STA to TDD slots within a TDD SP. It is used to inform a STA about when to transmit and expect reception within an allocated TDD-SP period.

FIG. 19 illustrates an example embodiment 230 of the TDD slot schedule element format. The element ID, Length, and Element ID extension indicate the type of element and length of the element. The Bit Map and Access Type Schedule field and Slot Category Schedule field indicate the mapping for transmit and reception and type of slots for this specific allocation.

FIG. 20 illustrates an example embodiment 250 of the slot schedule Control field format. The channel aggregation and BW fields define the BW the allocation is using. The slot schedule start time indicates when the schedule element information takes effect. The Number of TDD Intervals in the Bitmap indicates the number of TDD intervals in the bitmap after the TDD schedule start time. The allocation ID refers to a specific allocation identified by that ID. The Tx sector ID and the Tx DMG antenna ID indicate the sector and DMG antenna IDs used for transmission in this allocation as of the transmission of this element. The Rx sector ID and the Rx DMG antenna ID indicate the sector and DMG antenna IDs used for reception in this allocation as of the transmission of this element. In addition, in at least one embodiment, bits are reserved to support additional functionality.

6.3. Directional Information Element

A new element is introduced where it can be sent with frames that are broadcast in all directions, through either directional beams, using a quasi-omni antenna, or even through a different band. The new element, for example, can be attached to the beacon in DMG beacon transmission. Examples of the element are shown in the following figures.

FIG. 21 illustrates an example embodiment 270 of a directional informational (DI) element. The DI element contains the element ID, Length, and Element ID extension which indicate the type of element and length of the element. The number of antenna beams configured is indicated in the Number of antenna beam configuration. It determines the number of antenna configuration fields in the element. Each antenna configuration contains at least one pair of Transmit Direction and Receive direction fields, and more typically multiple pairs with transmit and receive information for multiple directions. The Transmit Direction and receive Direction fields are similar to the fields defined in FIG. 18.

Figure 22:
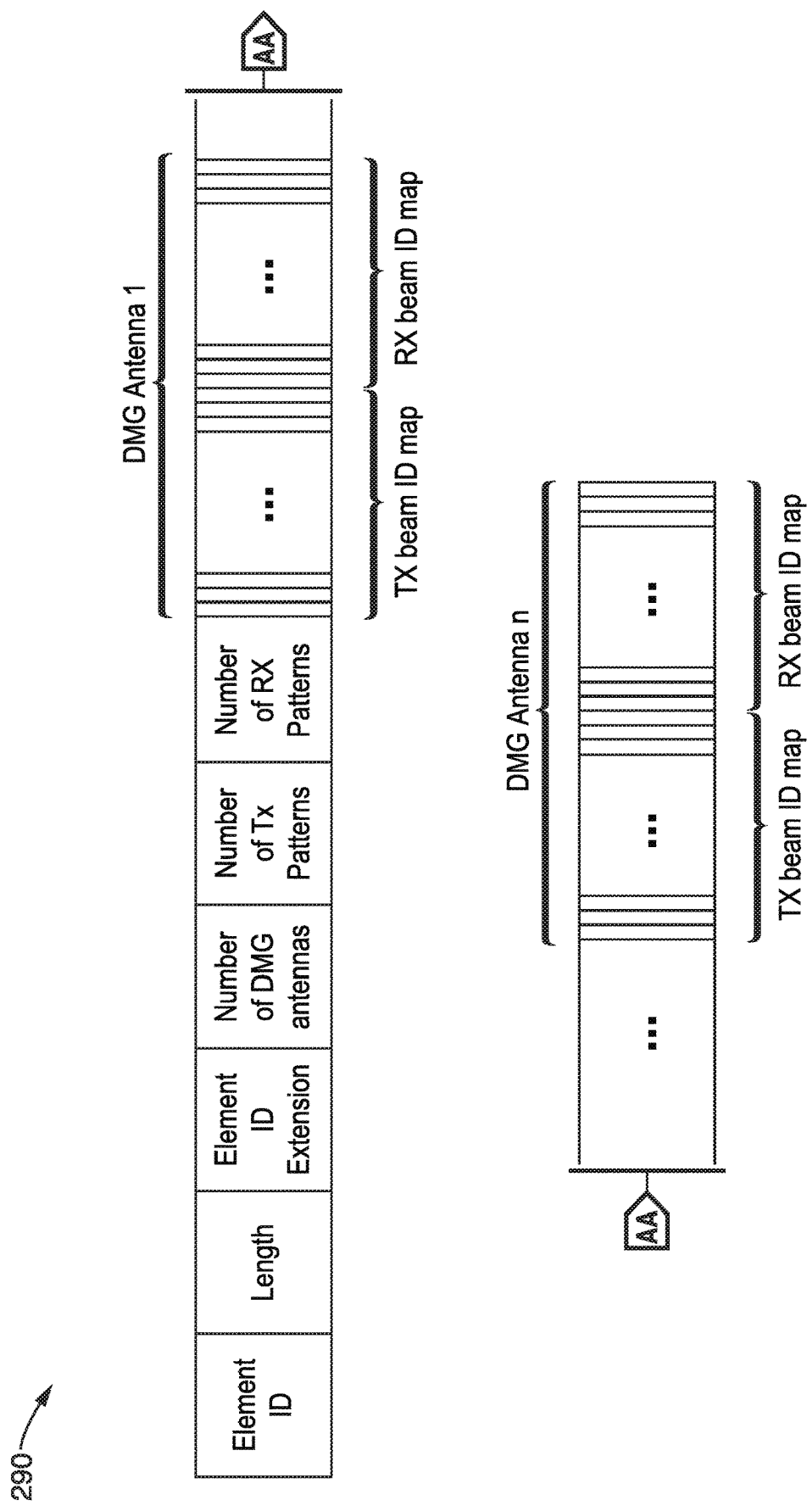
FIG. 22 is a data field diagram of another directional information element according to an embodiment of the present disclosure.

FIG. 22 illustrates an example embodiment 290 of another directional informational (DI) element. The element contains the element ID, Length, and Element ID extension which indicate the type of element and length of the element. The element contains a map for active beams for each DMG antenna. The Number of DMG antenna field indicates the number of Tx, Rx map fields in the element. The number of Tx beam patterns and the number of Rx beam patterns indicate the size of the Tx and Rx map. Each DMG antenna has a Tx and Rx beam ID map. The beam ID related to the map location is set if this beam ID is active in Tx or reception in the Tx or Rx beam ID map.

7. Allocation and Direction Tx Broadcasting Example

7.1. Broadcasting Only in Direction of Allocated Tx of TDD SP Scheduling and Allocation Information Each beacon transmitted in direction "i" contains the TDD slot schedule and TDD slot structure for the active transmission in that direction. If there is more than one active transmission or reception in that direction the TDD schedule and structure elements for these active Tx/Rx are included with the beacon. In at least one embodiment, the node sends the same TDD schedule and structure elements for these active Tx/Rx in neighboring directions to inform them of possible leakage from a nearby active beam.

Figure 23:
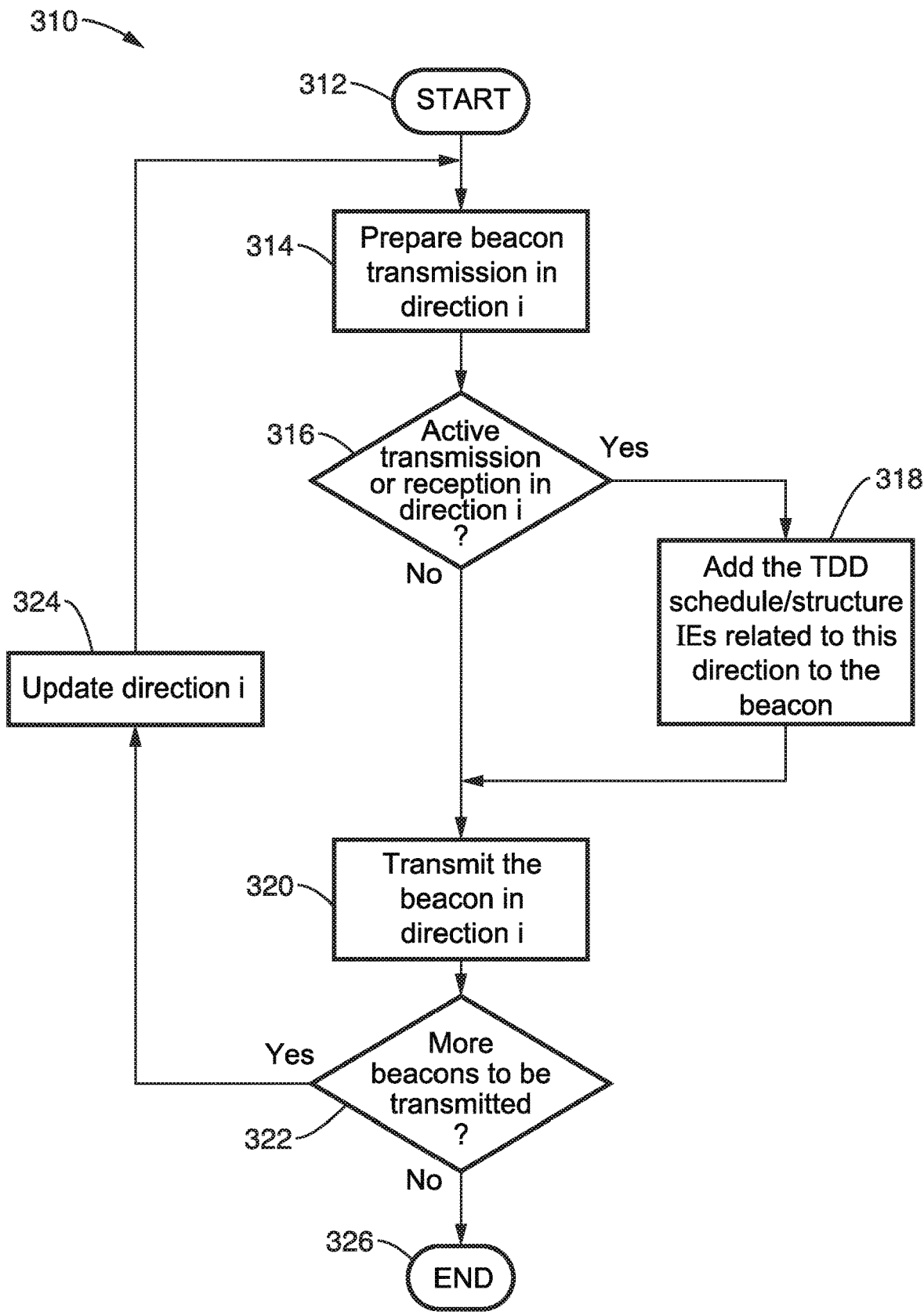
FIG. 23 is a flow diagram of transmission of beacons containing Time Division Duplex (TDD) directional and allocation information according to an embodiment of the present disclosure.

FIG. 23 illustrates an example embodiment 310 of transmitting beacons with TDD directional and allocation information. Processing starts 312 and beacon transmission is prepared 314 for direction "i". A check is made 316 if there is active transmission or reception for direction "i". If there is active Tx/Rx in that direction, then in block 318 the TDD schedule structure is added for this direction of beacon transmission, and execution moves to block 320. If there are no active Tx/Rx determined for that direction in block 316, then execution moves directly to block 320, which transmits the beacon in direction "i". A check is then made 322 if there are more beacons to be transmitted. If there are more beacons to be transmitted, then direction i is updated 324 to the next direction where a beacon is sent, then a return is made to block 314, otherwise the processing ends 326.

Figure 24A:
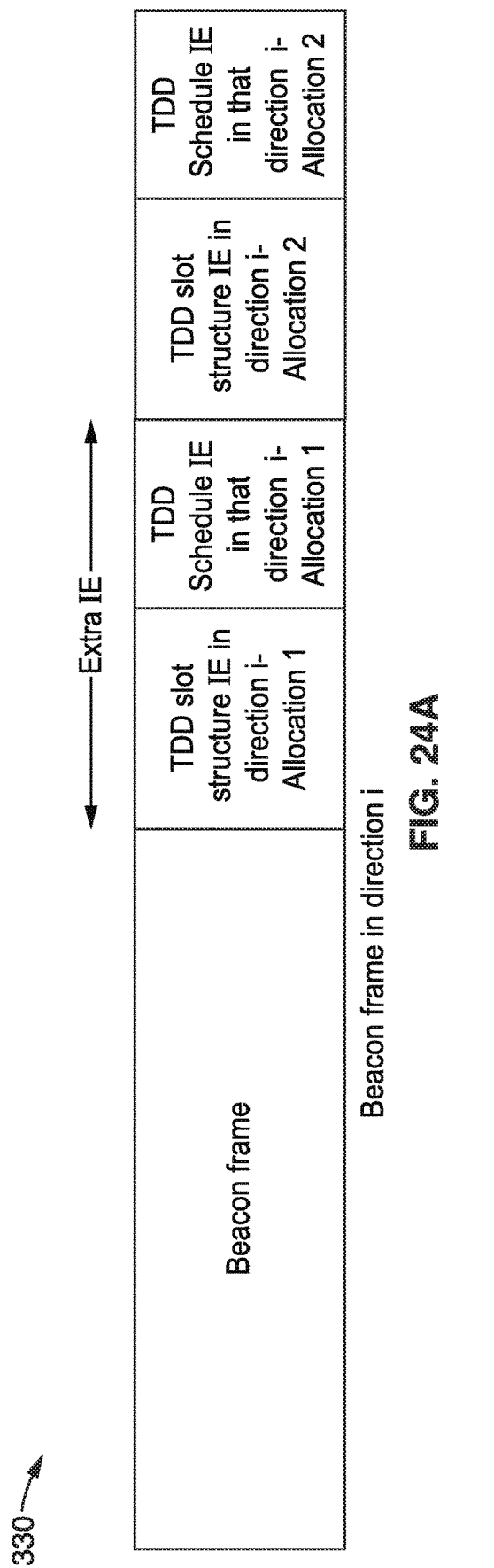
FIG. 24A and FIG. 24B are data field diagrams of beacon frames transmitted in different directions according to an embodiment of the present disclosure.
Figure 24B:
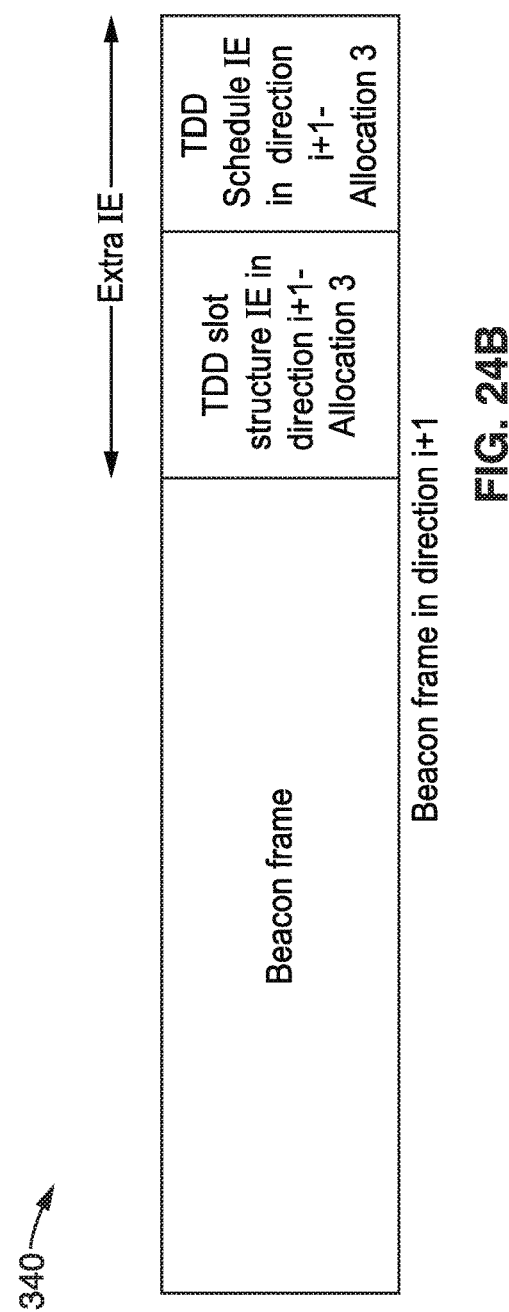

FIG. 24A and FIG. 24B illustrate example embodiments 330, 340 of frames transmitted in different beacon frame directions. In FIG. 24A an example of a beacon frame is shown transmitted with TDD slot schedule and structure information elements for two allocations (allocation 1 and allocation 2) that are active in direction "i" and for which the beacon is transmitted in direction "i". In FIG. 24B an example of a beacon frame is transmitted with TDD slot schedule and structure information elements for one allocation (nAllocation 3) that is active in direction i+1 and for which the beacon is transmitted in direction i+1.

7.2. Broadcasting All Scheduling, Allocation and Direction of Allocated Tx in All Directions for TDD SP Channel Access Each beacon transmitted in any direction "i" contains the TDD slot schedule and TDD slot structure elements for all active transmission, such as in all directions. Each of these elements refers to a specific allocation ID and defines beam ID used for this allocation. The receiving STA utilizes this information to determine if the intended direction of reception, or transmission, matches the allocation ID and beam ID which could lead to possible interference.

Figure 25:
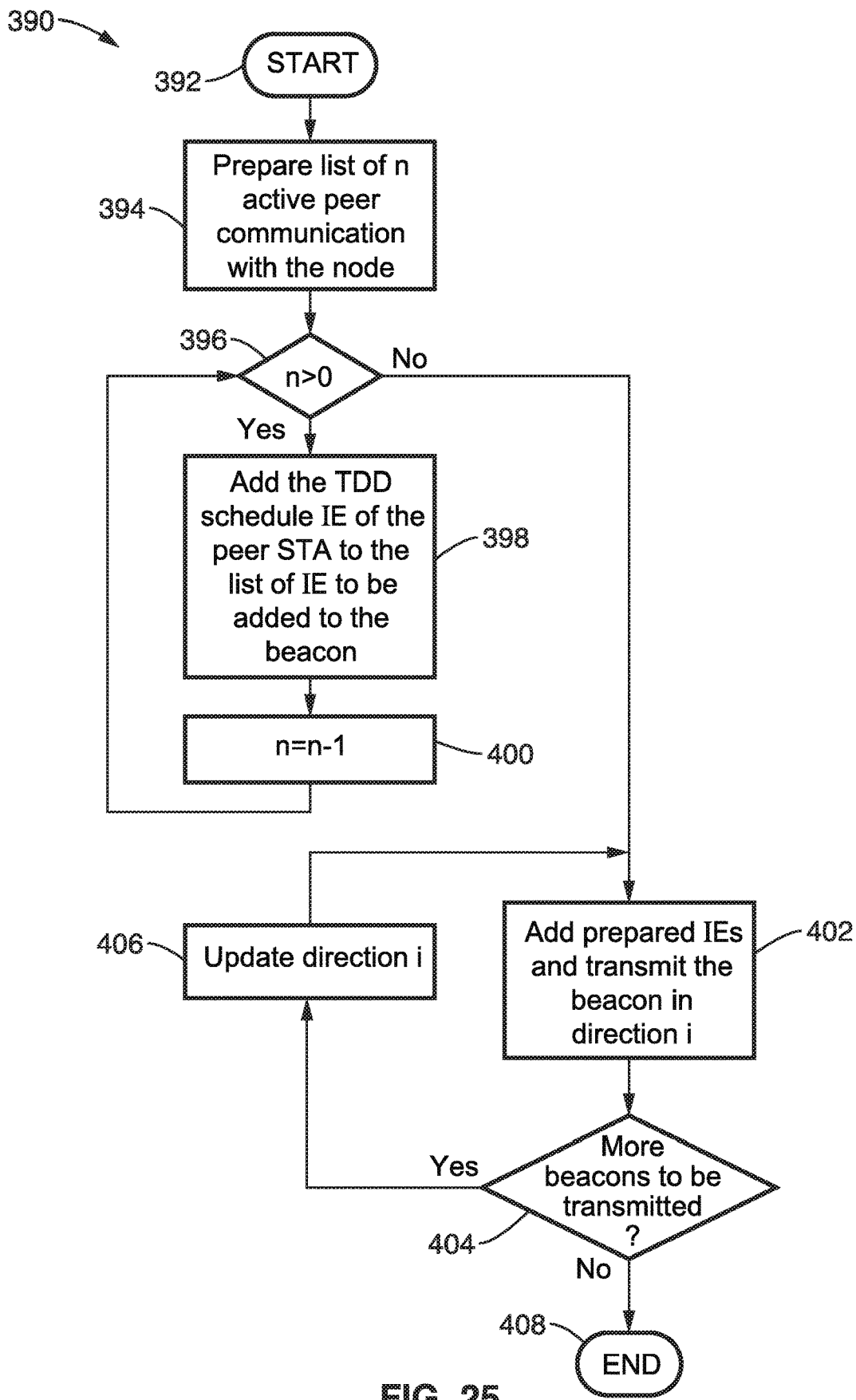
FIG. 25 is a flow diagram of transmitting beacons with Time Division Duplex (TDD) directional and allocation information according to an embodiment of the present disclosure.

FIG. 25 illustrates an example embodiment 390 of steps for transmitting beacons with TDD directional and allocation information. Processing starts 392 followed by preparing 394 a list of "n" active peers communicating with the present node (STA). A processing sequence starts by determining 396 if there are any active peers, or if they have all been processed. It should be appreciated, that although this is shown using a decrement count sequence, that an incrementing count sequence, or non-sequence coding used so that each of the active peers is addressed.

If there are active peers, then block 398 is reached and the TDD schedule is added to the beacon information elements (IE). Then, the active peer counter is decremented 400, with a return to block 396.

Otherwise, if there are no peers, or no more active peers, then block 402 is reached, adding prepared information elements (IEs), and the beacon is transmitted in direction "i". Then at block 404 a check is made if there are additional beacons to be transmitted. If there are more beacons, then the direction is updated at block 406 and a return is made to block 402, otherwise, execution ends at block 408.

Thus, it is seen that the TDD slot schedule and TDD slot structure elements are prepared for all active transmissions and receptions. The TDD slot schedule and TDD slot structure elements are all added to each beacon transmitted.

FIG. 26A and FIG. 26B illustrate example embodiments 410, 420 of different beacon frame transmissions. In FIG. 26A a beacon frame is transmitted with TDD slot schedule and structure information elements for "n" allocations that are active in all directions, the beacon is transmitted in direction "i", while in FIG. 26B the beacon frame is transmitted in direction "i+1" where the same elements are added for all directions.

7.3. Broadcast Extended DMG Allocation Information with Transmit and Receive Direction Information The STA adds the transmit and receive directions to each allocation field in the EDMG extended allocation element. The STA is configured to add the TDD scheduling and structure elements as described in the previous example if any of the allocations are a TDD SP allocation.

7.4. Broadcast Directional Information Element

Figure 27:
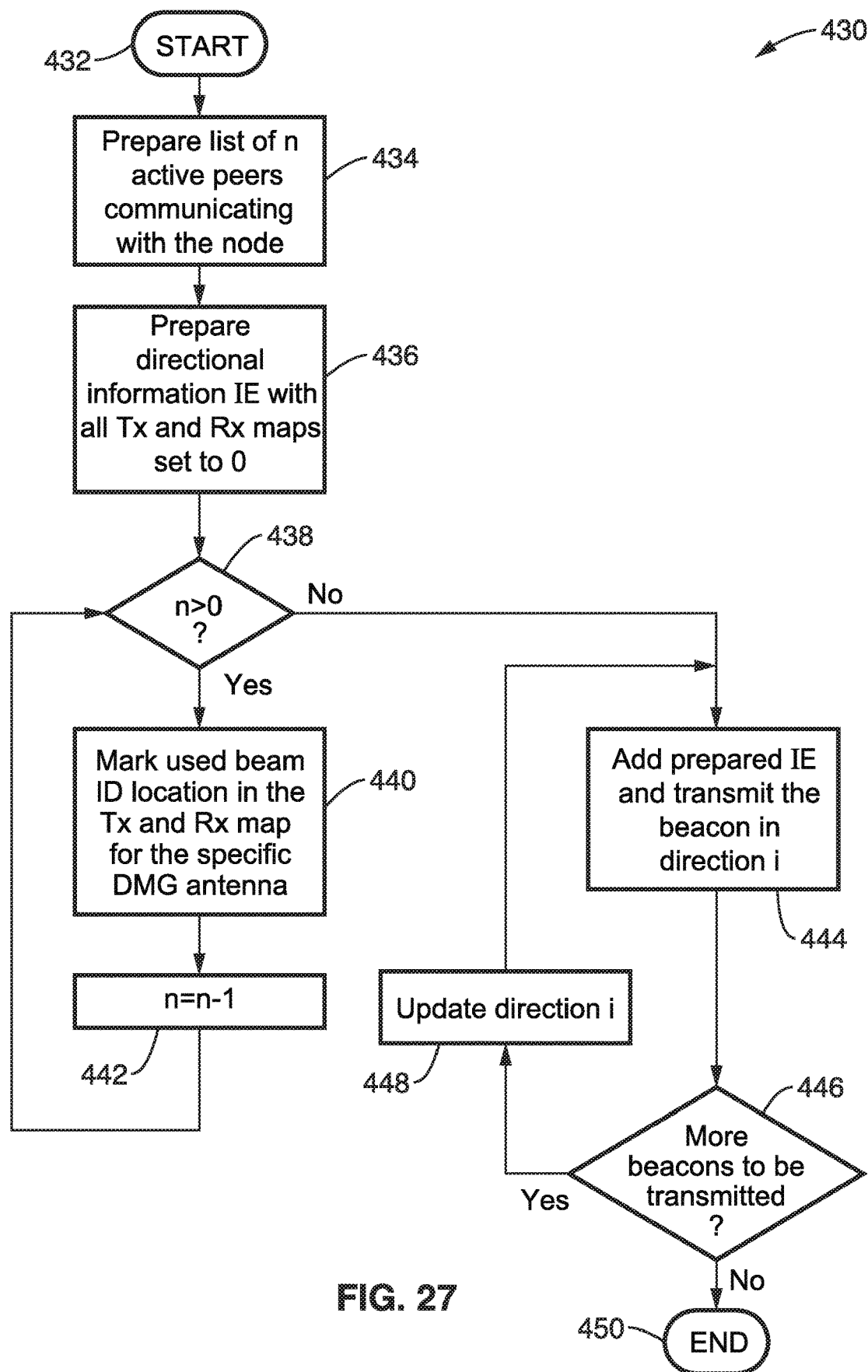
FIG. 27 is a flow diagram of transmitting beacons with a directional information element according to an embodiment of the present disclosure.

FIG. 27 illustrates an example embodiment 430 of transmitting beacons with a directional information element (IE). Processing starts 432 and a list of "n" peers, which are actively communicating with the node, is prepared 434. Directional information (IE) is prepared 436 with all the Tx and Rx maps set to null (zero). A check is made at block 438, if there are any additional active peers to be processed. If there are additional active peers found at block 438, then at block 440, beam information is recorded in the Tx and Rx maps for the beam ID location for the specific DMG antenna. The loop control is updated at block 442, in this case decrementing the value of "n". If there were no active peers, or all active peers have been addressed in the above sequence, then in block 444, the prepared information element (IE) is added to the beacon and it is transmitted in direction "i". A check is made at block 446 if there are more beacons to be transmitted. If there are more beacons, then the direction is updated at block 448 and a return is made to block 444, otherwise, execution ends at block 450.

Thus, it is seen above that each beacon transmitted carries the directional information element. The directional information element is prepared by going through all active communications with other peer STAs and marking the active Tx and Rx beam IDs in the map as used with respect to the corresponding DMG antenna. The STA sets all bits in the Tx Rx maps to zero (an indication of unused) and sequences through all the active communications and sets the beam ID used for Tx and Rx to 1 (an indication of in use). Once all active communication is performed, the information element is sent with any transmitted beacon or frame broadcasted to announce directional information.

8. STA Receiving Beacon with Allocation and Directional Tx or Rx Information

Any STA receiving the TDD SP Schedule and Structure elements, the extended schedule element or the directional information element, such as through a beacon frame, can extract information about the spectrum allocation in the direction it is received from. If the directional information is available in the allocation schedule, the STA compares the transmit beam ID of the received beacon to the directional information in the allocation information. If the beacon Tx beam ID matches with any of the directional beam IDs of the allocation contained in the scheduling elements, then this indicates that there is an active transmission or reception in that direction. In response to this, the STA can take one of a number of actions as described in the following sections.

Figure 28:
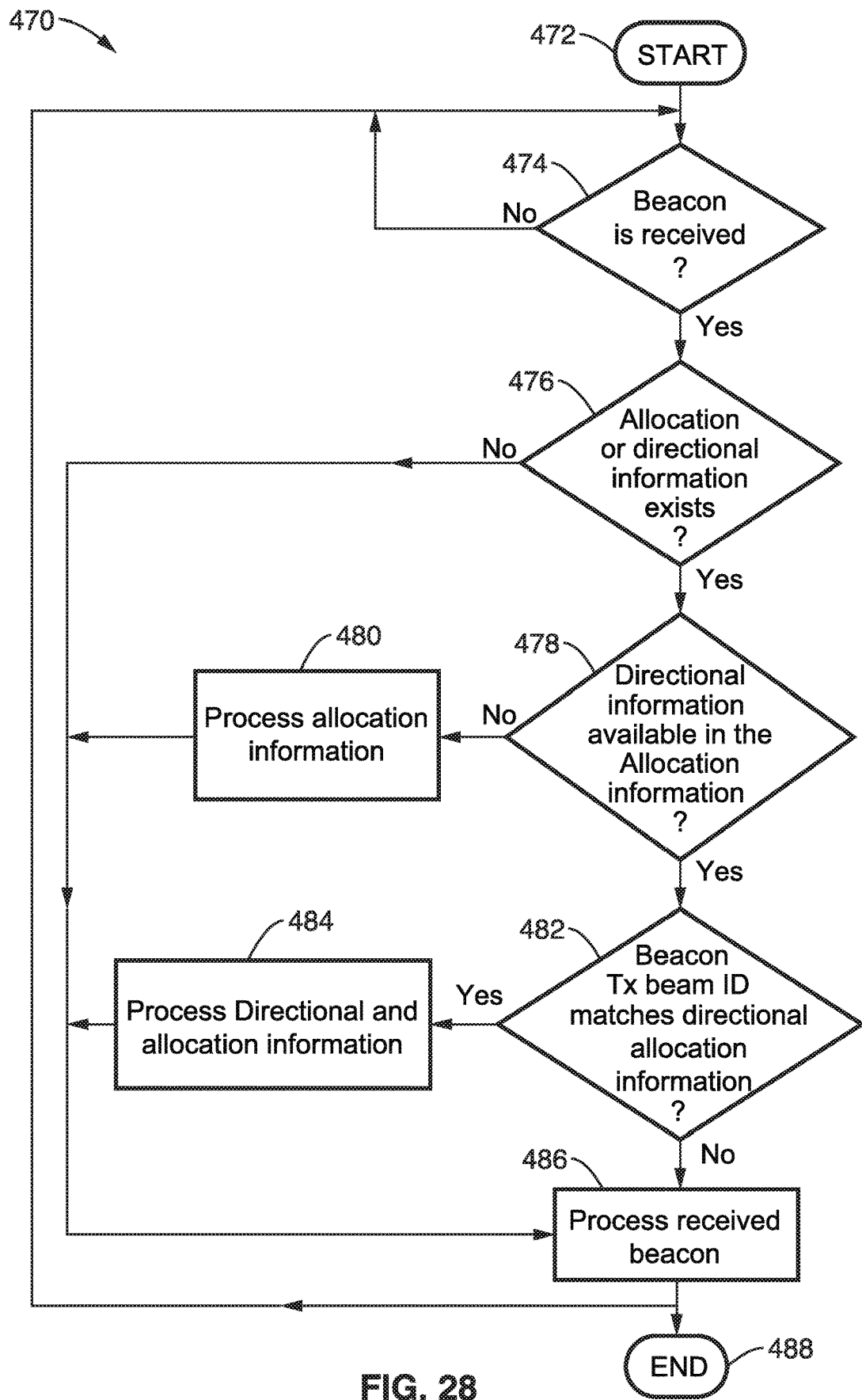
FIG. 28 is a flow diagram of a station receiving beacons, containing allocation and directional information, from another station according to an embodiment of the present disclosure.

FIG. 28 illustrates an example embodiment 470 of a STA receiving beacons. Processing starts 472 and a check is made 474 for a beacon being received. If a beacon is not received, then execution returns to block 474, or processing moves off to perform other tasks, and later checks for beacon receipt. If it is found that a beacon is received, then at block 476 a check is made if the beacon contains allocation or directional information elements. If there are no additional information elements, then execution moves to block 486. Otherwise, the information elements are processed starting at block 478, with a check for directional information being available in the allocation information. If there is no directional information, then block 480 is executed which processes allocation information, and execution moves to block 486. Otherwise, if there is directional information, then block 482 is reached which checks if the beacon Tx beam ID matches the directional allocation information. If there is a match, then block 484 processes the directional and allocation information and execution moves to block 486. Otherwise, if there are no matches at block 482, then execution moves directly to block 486. At block 486 the received beacon is processed, after which this process ends 488.

Thus, the above processing illustrates that the beacons can be received from another STA within the BSS that the STA is part of, or from a different BSS STA. The STA can process the beacon information even if it was from a different BSS other than the one the STA is part off. Once an STA receives a beacon, if allocation information does not exist in the beacon, the STA processes the beacon in the typical manner. If Allocation information exists (TDD SP schedule and structure or extended schedule elements), the STA monitors for directional transmission and reception information attached to the beacon. If there is no directional transmission and reception information contained in the beacon (direction of transmission and reception of active transmission and receptions), the STA processes the allocation information only in the beacon.

This processing provides a number of benefits as follows. (a) Avoiding transmission or reception at a time when the other nodes are active in transmission or reception. (b) Performing beamforming with the node to allocate, and thus mark as used, the direction of interference. (c) Estimating expected interference and determining period(s) where interference is expected to be less compared to another period(s) of time. (d) Estimating level of occupancy of a specific STA to determine if a situation exists in which direct communication with that STA is warranted.

It should be appreciated that having the directional information available allows determining with greater certainty if interference is, or could be, affecting the receiving STA. However if the directional information does not match the beacon Tx beam ID, the STA assumes that this allocation is not affecting the node since it is in a different direction that might not be received by the STA. Unless a beacon is received from an interfering station from the direction of interference, during active transmission or reception, the STA does not consider this as a threat to its communication, and the STA processes the beacon in the typical manner.

9. Beamforming to Find Potential Interference Direction

A STA receiving a beacon with directional and allocation information is informed about the existence of potential interference regarding a specific time allocation. Since the sensing is usually performed using a quasi-omni directional antenna, it is not known which directions can be affected by this interfering station. A STA detecting a potential interference can trigger beamforming to determine the direction of the potential interfering station. The purpose of beamforming in this instance is not to setup a link or perform authentication or association with the discovered node. The beamforming is triggered based on the type of channel access the discovered STA is using, whether it is TDD beamforming or regular beamforming. One implementation of performing this Rx beamforming is by sending TRN fields (Training fields) with the beacon or the SSW frame. This would aid the STA in finding the direction of interference without the need to communicate with the other STA. After beamforming with the interfering station, the STA can determine the direction the interference is coming from and take that into account when accessing the spectrum in that direction.

Figure 29A:
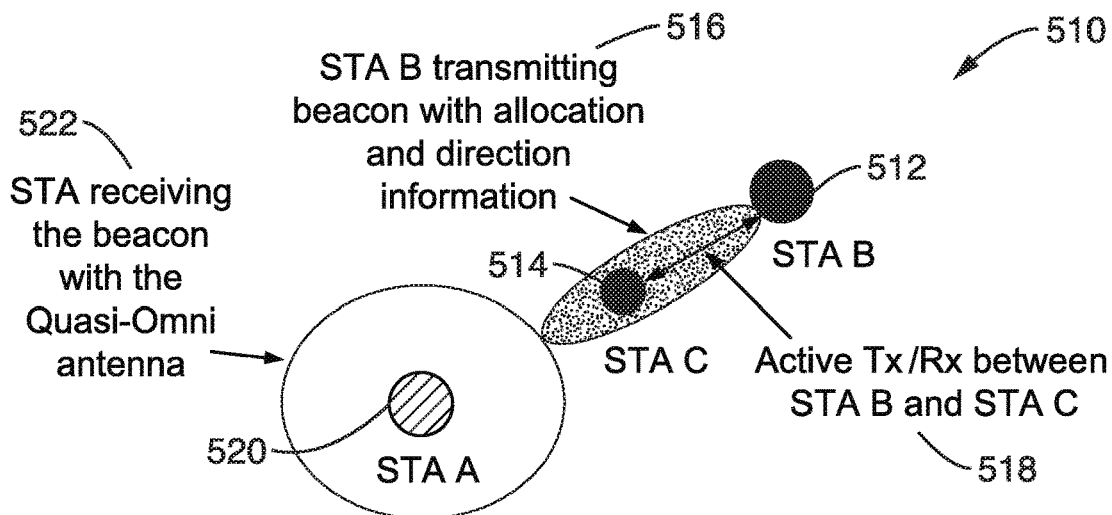
FIG. 29A through FIG. 29C is a communication process diagram between stations in which interference is detected and handled according to an embodiment of the present disclosure.
Figure 29B:
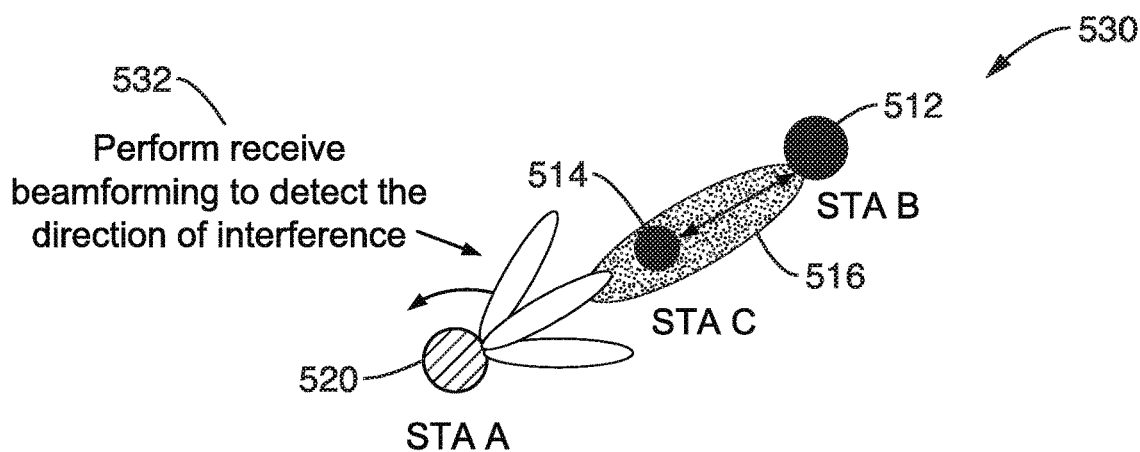
Figure 29C:
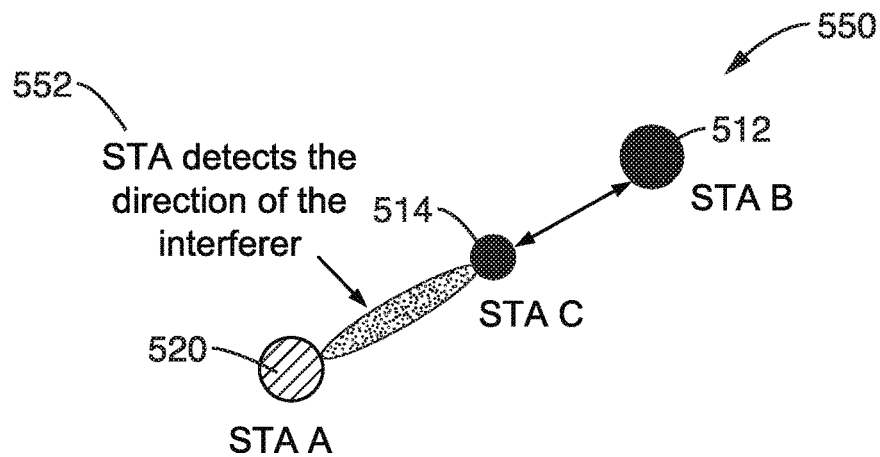

FIG. 29A through FIG. 29C illustrates an example embodiment 510, 530, 550 depicting STA A 520, STA B 512 and STA C 514. In FIG. 29A STA B 512 is communicating with STA C 514 in a process in which STA B 512 transmits beacon 516 in the direction of STA C 514 and has established an active Tx/Rx communication 518. It is seen that STA A 520 also receives 522 the beacon with a quasi-omni antenna. In FIG. 29B STA A 520 discovers the interference and performs RX beamforming 532 in order to determine the direction of the interfering station. In FIG. 29C STA A 520 determines 552 the direction of the interfering station.

10. Accessing the Channel Above CCA Threshold

FIG. 30A through FIG. 30D illustrate an example embodiment 610, 630, 650, 670 of accessing a channel above the CCA threshold. A STA sensing the channel using a quasi-omni antenna can obtain a false indication of channel usage in the direction that it is interested in using. If the STA senses the channel and finds no transmission it should be free to access the channel, however if the CCA failed it might be a false alarm since the STA is communicating in a different direction in relation to the sensed interference.

Figure 30A:
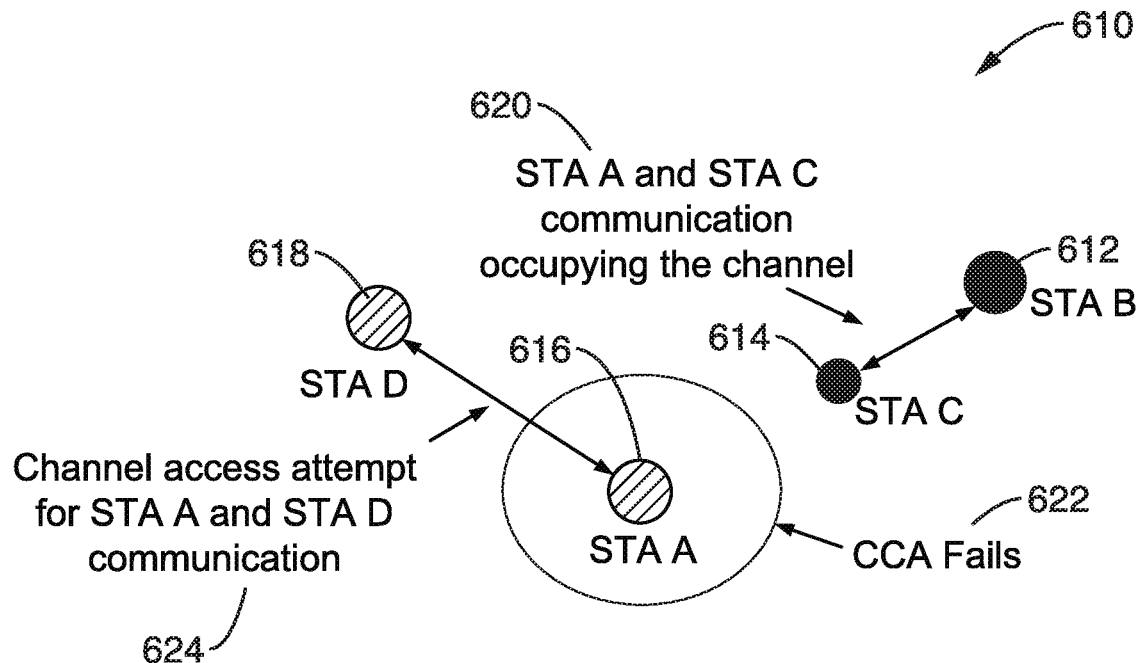
FIG. 30A through FIG. 30D is a communication process diagram of stations accessing a channel above the Clear Channel Assessment (CCA) threshold as performed according to an embodiment of the present disclosure.

Stations (STAs) STA A 616, STA B 612, STA C 614, and STA D 618 are shown in a local portion of a mmW network. In FIG. 30A it is seen that STA B 612 and STA C 614 have established communications 620 occupying that directional sector (channel). STA A 616 and STA D 618 attempt channel access 624 and the clear channel assessment (CCA) fails 622.

Figure 30B:
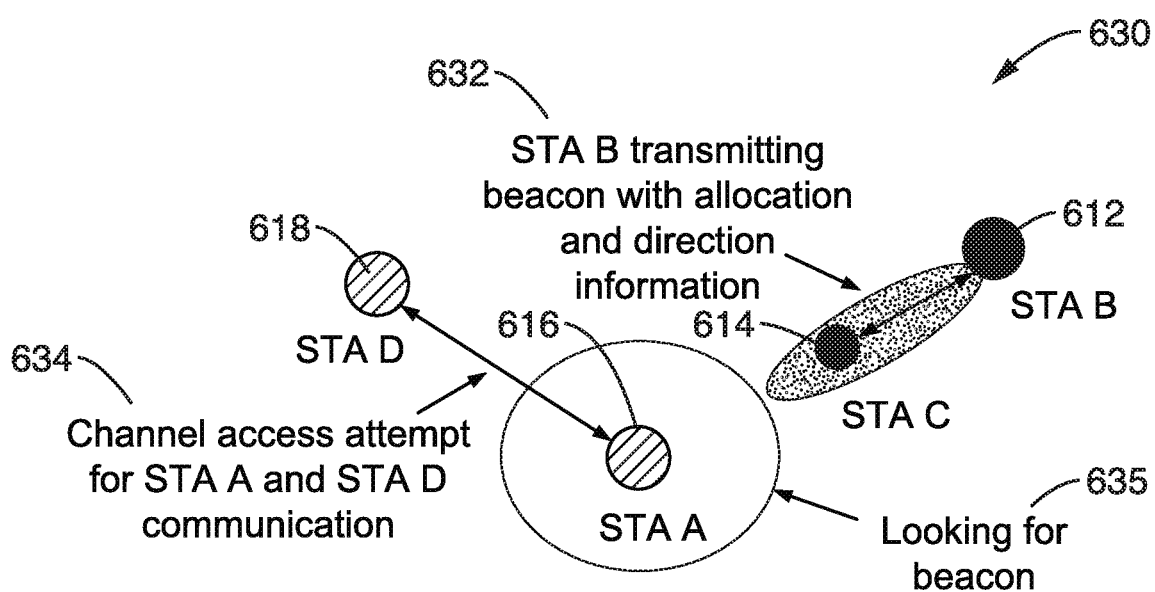

In FIG. 30B, after the CCA failed, STA A 616 listens 635 for beacons. In FIG. 30A the channel access attempt by STA A failed, so STA A is still trying to access 634 the channel through listening for beacons. All the procedure discussed here is part of the channel access attempt STA B 612 is seen transmitting 632 a beacon with allocation and direction information. In the present disclosure, if a beacon is found with directional transmission information (such as seen here from STA B) it is used to find if the interference is coming for the direction of the intended communication. The beacon carries information about the allocation in the channel and direction of transmission. If the received beam ID from a received beacon matches the allocation beam ID, then this indicates that the interference might be a threat. If not, that means that the interfering station might be located in a direction that is not affecting the sensing node.

Figure 30C:
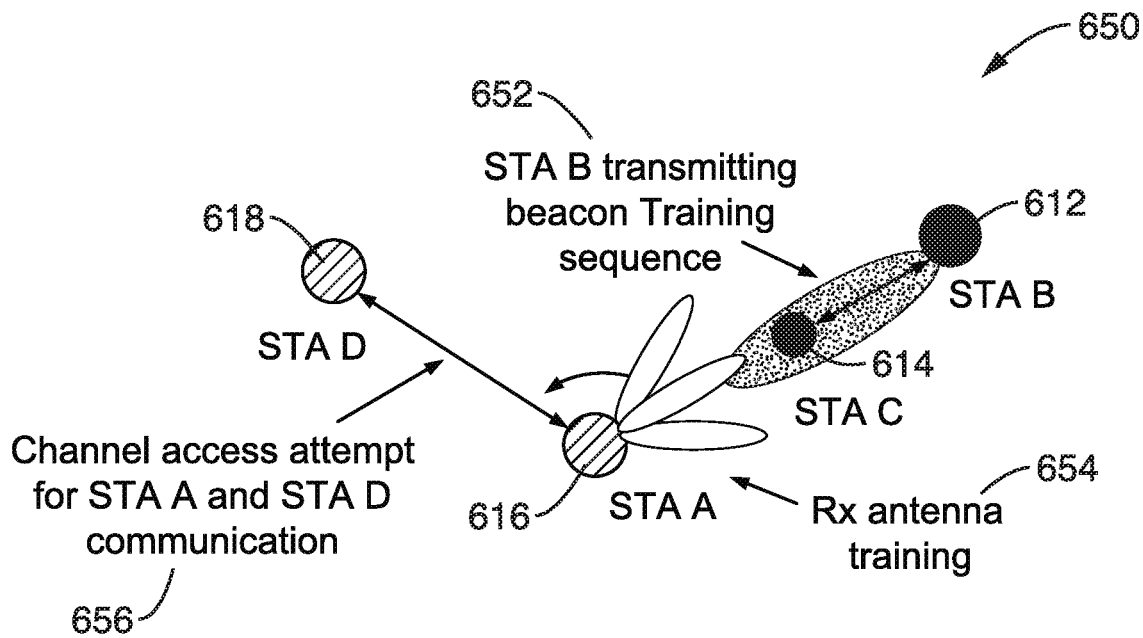

In FIG. 30C STA B 612 is seen performing Tx antenna training 652, and STA A 616 is seen performing Rx antenna training 654. It will be recognized that in the present disclosure, if the beacon is marked as a potential interfering station (e.g., interferer), in at least one instance, the STA performs beamforming with the interferer to determine the direction affected by the interferer. In at least one example embodiment, the STA transmitting the beacon transmits TRN fields (Training fields) to assist the other STA in Rx beam training, although other ways of handling the interference can be performed.

Figure 30D:
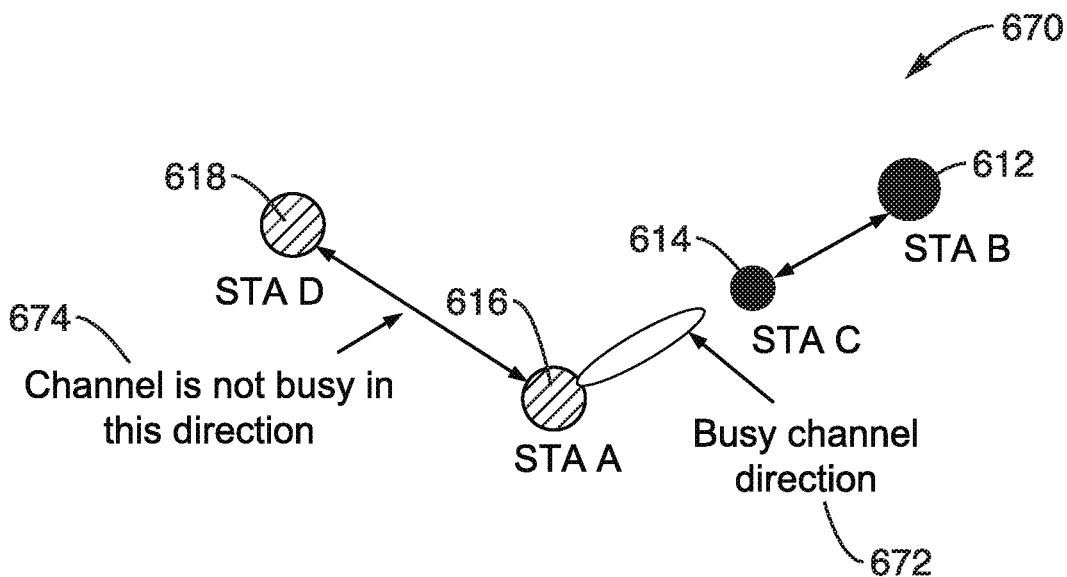

In FIG. 30D STA A determines the antenna direction sector which is causing the interference, and at least this sector is marked as being busy. It should be appreciated that the present disclosure is also configured with the ability, if desired, to also mark neighboring sectors as busy if the received power threshold is high, or for example based on other information, such as knowledge of node movement. It will be noted that a direction marked as busy is blocked for access, since some other node is transmitting information in that direction and interference is high. The STA (STA A) can though access other "not busy" directions (STA D) in this example.

11. Summary of Disclosure Elements

The following summary discloses certain important elements of the instant disclosure, however the summary is not to be construed as describing the only important elements of the disclosure.

STAs announce their time allocations and the directionality of allocation by broadcasting this information with the network discovery signal. Both the allocation and directional information being broadcast identify the time resources allocated in each of the directions. This information can be broadcast as follows. (a) STAs scheduling allocations are communicated in case of CBAP or SP channel access and the Tx beam direction of this allocation. (b) STAs Slot Structure and Slot schedule information is communicated in the case of TDD SP channel access and the Tx beam direction of this allocation. (c) A directional information element is communicated that contains directions where active allocation (transmit or receive activity) is scheduled.

The STA can send the allocation and the directional information by any one of the following methods. (a) Transmission in each direction of the list of TDD SP slot schedules and structures related to the allocation in that direction. (b) Broadcast all TDD SP slot schedule and structure elements in all directions. (c) Broadcast the EDMG scheduled allocation information and transmit and receive directional information in all directions. (d) Broadcast the directional information element in all directions.

STAs should at least transmit beacons in the direction of transmission. The beacon can contain all allocation and directional information. Other STAs receiving the beacons can obtain information about the allocation and directionality of transmission in the network.

STAs compare the beacon Tx beam ID with the allocation Tx beam ID to know if the allocation is in the direction of reception or not.

STAs can perform Rx beamforming with the received beacon if it is indicating interference in its direction. This can be performed through using additional training fields sent attached to the beacon or other beamforming techniques.

STAs can use the Rx beamforming information to identify channel usage directions. If the sensed channel usage turned out to be from a direction other than that of the intended direction of access, the STA can access the channel even if the CCA fails.

12. General Scope of Embodiments

The enhancements described in the presented technology can be readily implemented within the protocols of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating with at least one other wireless communication circuit using directional communications; (b) a processor coupled to said wireless communication circuit within a station configured for operating on a wireless network; (c) a non-transitory memory storing instructions executable by the processor; and (d) wherein said instructions, when executed by the processor, perform steps comprising: (d)(i) broadcasting time and directional allocations which identify time and resource allocations in each direction of the directional communications; (d)(ii) wherein said directional allocations are sent within a network discovery signal that is broadcast as: (A) scheduling allocations in a Contention-Based Access Period (CBAP) or regular Service Period (SP) channel access and transmit beam direction of this allocation, or (B) communicating slot structure and slot schedule information for Time Division Duplex (TDD) Service Period (SP) channel access and transmit beam direction of this allocation, or (C) communicating a directional information element containing directions in which active allocation of transmit or receive activity is scheduled.

2. An apparatus for wireless communication in a network, the apparatus comprising: (a) a wireless communication circuit configured for wirelessly communicating with at least one other wireless communication circuit using directional communications; (b) a processor coupled to said wireless communication circuit within a station configured for operating on a wireless network; (c) a non-transitory memory storing instructions executable by the processor; and (d) wherein said instructions, when executed by the processor, perform steps comprising: (d)(i) broadcasting time and directional allocations which identify time and resource allocations in each direction of the directional communications; (d)(ii) wherein said time and directional allocations are sent within a network discovery signal that is broadcast as: (A) scheduling allocations in a Contention-Based Access Period (CBAP) or regular Service Period (SP) channel access and transmit beam direction of this allocation, or (B) communicating slot structure and slot schedule information for Time Division Duplex (TDD) Service Period (SP) channel access and transmit beam direction of this allocation, or (C) communicating a directional information element containing directions in which active allocation of transmit or receive activity is scheduled; and (d)(iii) wherein time and directional allocations are selected from the group of broadcasting mechanisms consisting of: (A) transmitting a list of Time Division Duplex (TDD) Service Period (SP) slot schedules and structures in each direction which describes allocation in that direction; (B) broadcasting all Time Division Duplex (TDD) Service Period (SP) slot schedules and structure elements in all directions; (C) broadcasting Extended Directional Multi-Gigabit (EDMG) scheduled allocation information and transmit and receive directional information in all directions; and (D) broadcasting directional information elements in all directions.

3. A method of performing wireless communication in a network, the method comprising: (a) wirelessly communicating between wireless communication circuits, stations, configured for wirelessly communicating with one another using directional communications; (b) broadcasting time and directional allocations which identify time and resource allocations in each direction of the directional communications as sent within a network discovery signal that is broadcast as: (b)(i) scheduling allocations in a Contention-Based Access Period (CBAP) or regular Service Period (SP) channel access and transmit beam direction of this allocation, or (b)(ii) communicating slot structure and slot schedule information for Time Division Duplex (TDD) Service Period (SP) channel access and transmit beam direction of this allocation, or (b)(iii) communicating a directional information element containing directions in which active allocation of transmit or receive activity is scheduled.

4. The apparatus or method of any preceding embodiment, wherein said instructions when executed by the processor perform said broadcasting of time and directional allocations as selected from the group of broadcasting mechanisms consisting of: (a) transmitting a list of Time Division Duplex (TDD) Service Period (SP) slot schedules and structures in each direction which describes allocation in that direction; (b) broadcasting all Time Division Duplex (TDD) Service Period (SP) slot schedules and structure elements in all directions; (c) broadcasting Extended Directional Multi-Gigabit (EDMG) scheduled allocation information and transmit and receive directional information in all directions; and (d) broadcasting directional information elements in all directions.

5. The apparatus or method of any preceding embodiment, wherein said instructions when executed by the processor further comprise said station transmitting beacons or beamforming frames, containing time and directional allocations, in said station's direction of transmission, from which stations receiving the beacons or beamforming frames can obtain information on allocation and directionality of transmission for the network.

6. The apparatus or method of any preceding embodiment, wherein said instructions when executed by the processor further comprise comparing beacon or beamforming frame transmit beam ID with the allocation transmit beam ID to determine if the allocation is in the direction of reception or not.

7. The apparatus or method of any preceding embodiment, wherein said instructions when executed by the processor further comprises performing receiver beamforming in response to receiving a beacon or a beamforming frame indicating that interference is arising in its direction.

8. The apparatus or method of any preceding embodiment, wherein said receiver beamforming is performed comprising utilizing additional training fields attached to the beacon or the beamforming frame used.

9. The apparatus or method of any preceding embodiment, wherein said instructions when executed by the processor further comprise utilizing receiver beamforming information to identify channel usage directions, so that if sensed channel usage is from a direction other that an intended direction of access, said station can obtain channel access even if a Clear Channel Assessment (CCA) fails.

10. The apparatus or method of any preceding embodiment, wherein said wireless communication circuit comprises a millimeter wave station configured for directional communications.

11. The apparatus or method of any preceding embodiment, wherein said wireless communication circuit is configured for operating in both mesh networks and non-mesh networks.

12. The apparatus or method of any preceding embodiment, wherein said wireless communication circuit is configured with directional communications on a first band and for quasi-omni directional communications on a second band.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a wireless local area network (WLAN), the apparatus comprising:
    (a) a wireless communication circuit configured for wirelessly communicating with at least one other wireless communication circuit using directional communications;
    (b) a processor coupled to said wireless communication circuit within a station configured for operating on a wireless network;
    (c) a non-transitory memory storing instructions executable by the processor; and
    (d) wherein said instructions, when executed by the processor, perform allocation and directional information distribution steps comprising:
        (i) broadcasting time and directional allocations which identify time and resource allocations in each direction of the directional communications, wherein said directional allocations comprise information sector identification (ID) and antenna identification (ID) of each allocated transmission or possible transmission in a specific service period (SP);
        (ii) wherein said directional allocations are sent within a network discovery signal that is broadcast as: (A) scheduling allocations in a Contention-Based Access Period (CBAP) or regular Service Period (SP) channel access and transmit beam direction of this allocation, or (B) communicating slot structure and slot schedule information for Time Division Duplex (TDD) Service Period (SP) channel access and transmit beam direction of this allocation, or (C) communicating a directional information element containing directions in which active allocation of transmit or receive activity is scheduled.

2. The apparatus of claim 1, wherein said instructions when executed by the processor perform said broadcasting of time and directional allocations as selected from the group of broadcasting mechanisms consisting of:
    (a) transmitting a list of Time Division Duplex (TDD) Service Period (SP) slot schedules and structures in each direction which describes allocation in that direction;
    (b) broadcasting all Time Division Duplex (TDD) Service Period (SP) slot schedules and structure elements in all directions;
    (c) broadcasting Extended Directional Multi-Gigabit (EDMG) scheduled allocation information and transmit and receive directional information in all directions; and
    (d) broadcasting directional information elements in all directions.

3. The apparatus of claim 1, wherein said instructions when executed by the processor further comprise said station transmitting beacons or beamforming frames, containing time and directional allocations, in said station's direction of transmission, from which stations receiving the beacons or beamforming frames can obtain information on allocation and directionality of transmission for the network.

4. The apparatus of claim 1, wherein said instructions when executed by the processor further comprise comparing beacon or beamforming frame transmit beam ID with the allocation transmit beam ID to determine if the allocation is in the direction of reception or not.

5. The apparatus of claim 1, wherein said instructions when executed by the processor further comprises performing receiver beamforming in response to receiving a beacon or a beamforming frame indicating that interference is arising in its direction.

6. The apparatus of claim 5, wherein said receiver beamforming is performed comprising utilizing additional training fields attached to the beacon or the beamforming frame used.

7. The apparatus of claim 1, wherein said instructions when executed by the processor further comprise utilizing receiver beamforming information to identify channel usage directions, so that if sensed channel usage is from a direction other that an intended direction of access, said station can obtain channel access even if a Clear Channel Assessment (CCA) fails.

8. The apparatus of claim 1, wherein said wireless communication circuit comprises a millimeter wave station configured for directional communications.

9. The apparatus of claim 1, wherein said wireless communication circuit is configured for operating in both mesh networks and non-mesh networks.

10. The apparatus of claim 1, wherein said wireless communication circuit is configured with directional communications on a first band and for quasi-omni directional communications on a second band.

11. An apparatus for wireless communication in a wireless local area network (WLAN), comprising:
   (a) a wireless communication circuit configured for wirelessly communicating with at least one other wireless communication circuit using directional communications;
   (b) a processor coupled to said wireless communication circuit within a station configured for operating on a wireless network;
   (c) a non-transitory memory storing instructions executable by the processor; and
   (d) wherein said instructions, when executed by the processor, perform allocation and directional information distribution steps comprising:
      (i) broadcasting time and directional allocations which identify time and resource allocations in each direction of the directional communications wherein said directional allocations comprise information sector identification (ID) and antenna identification (ID) of each allocated transmission or possible transmission in a specific service period (SP); and
      (ii) wherein time and directional allocations are selected from the group of broadcasting mechanisms consisting of: (a) transmitting a list of Time Division Duplex (TDD) Service Period (SP) slot schedules and structures in each direction which describes allocation in that direction; (b) broadcasting all Time Division Duplex (TDD) Service Period (SP) slot schedules and structure elements in all directions; (c) broadcasting Extended Directional Multi-Gigabit (EDMG) scheduled allocation information and transmit and receive directional information in all directions; and (d) broadcasting directional information elements in all directions.

12. The apparatus of claim 11, wherein said instructions when executed by the processor further comprise said station transmitting beacons or beamforming frames, containing time and directional allocations, in said station's direction of transmission, from which stations receiving the beacons or beamforming frames can obtain information on allocation and directionality of transmission for the network.

13. The apparatus of claim 11, wherein said instructions when executed by the processor further comprise comparing beacon or beamforming frame transmit beam ID with the allocation transmit beam ID to determine if the allocation is in the direction of reception or not.

14. The apparatus of claim 11, wherein said instructions when executed by the processor further comprises performing receiver beamforming in response to receiving a beacon or a beamforming frame indicating that interference is arising in its direction.

15. The apparatus of claim 14, wherein said receiver beamforming is performed comprising utilizing additional training fields attached to the beacon or the beamforming frame used.

16. The apparatus of claim 11, wherein said instructions when executed by the processor further comprise utilizing receiver beamforming information to identify channel usage directions, so that if sensed channel usage is from a direction other that an intended direction of access, said station can obtain channel access even if a Clear Channel Assessment (CCA) fails.

17. The apparatus of claim 11, wherein said wireless communication circuit comprises a millimeter wave station configured for directional communications.

18. The apparatus of claim 11, wherein said wireless communication circuit is configured for operating in both mesh networks and non-mesh networks.

19. The apparatus of claim 11, wherein said wireless communication circuit is configured with directional communications on a first band and for quasi-omni directional communications on a second band.

20. A method of performing wireless communication in a wireless local area network (WLAN), comprising:
   (a) wirelessly communicating between wireless communication circuits, stations, configured for wirelessly communicating with one another using directional communications;
   (b) broadcasting time and directional allocations which identify time and resource allocations in each direction of the directional communications, wherein said directional allocations comprise information sector identification (ID) and antenna identification (ID) of each allocated transmission or possible transmission in a specific service period (SP); and
   (c) wherein said time and directional allocations are as sent within a network discovery signal that is broadcast as: (A) scheduling allocations in a Contention-Based Access Period (CBAP) or regular Service Period (SP) channel access and transmit beam direction of this allocation, or (B) communicating slot structure and slot schedule information for Time Division Duplex (TDD) Service Period (SP) channel access and transmit beam direction of this allocation, or (C) communicating a directional information element containing directions in which active allocation of transmit or receive activity is scheduled.

* * * * *